US010523707B2

(12) United States Patent
Sharifi Mehr et al.

(10) Patent No.: US 10,523,707 B2
(45) Date of Patent: Dec. 31, 2019

(54) SECURE TRANSPORT CHANNEL USING MULTIPLE CIPHER SUITES

(71) Applicant: Amazon Technologies, Inc., Seattle, WA (US)

(72) Inventors: Nima Sharifi Mehr, Vancouver (CA); Darren Ernest Canavor, Redmond, WA (US); Jesper Mikael Johansson, Redmond, WA (US); Jon Arron McClintock, Seattle, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/925,470

(22) Filed: Mar. 19, 2018

(65) Prior Publication Data

US 2018/0262530 A1 Sep. 13, 2018

Related U.S. Application Data

(63) Continuation of application No. 14/720,625, filed on May 22, 2015, now Pat. No. 9,923,923, which is a
(Continued)

(51) Int. Cl.
*H04L 9/32* (2006.01)
*H04L 29/06* (2006.01)

(52) U.S. Cl.
CPC .............. *H04L 63/166* (2013.01); *H04L 9/32* (2013.01); *H04L 63/04* (2013.01); *H04L 63/0428* (2013.01); *H04L 63/205* (2013.01)

(58) Field of Classification Search
CPC ......... H04L 63/166; H04L 9/32; H04L 63/04; H04L 63/205
(Continued)

(56) References Cited

U.S. PATENT DOCUMENTS 6,094,485 A   7/2000  Weinstein et al.
6,125,446 A *  9/2000  Olarig .................... G06F 21/57
                                                709/223
(Continued)

FOREIGN PATENT DOCUMENTS

CN       1503504        6/2004
EP       1372119       12/2003
WO    WO2012134218    10/2012

OTHER PUBLICATIONS

Carvalho et al., "Moving-Target Defenses for Computer Networks," Florida Institute of Technology, Copublished by the IEEE Computer and Reliability Societies, Mar./Apr. 2014, pp. 73-76.
(Continued)

*Primary Examiner* — Abu S Sholeman
*Assistant Examiner* — Thanh T Le
(74) *Attorney, Agent, or Firm* — David Wright Tremaine LLP

(57) ABSTRACT

A plurality of cipher suites is negotiated as part of a handshake process to establish a cryptographically protected communications session. The handshake process is completed to establish the cryptographically protected communications session. A message is communicated over the established cryptographically protected communications session using at least two cipher suites of the plurality of cipher suites.

21 Claims, 21 Drawing Sheets

Related U.S. Application Data continuation-in-part of application No. 14/483,071, filed on Sep. 10, 2014, and a continuation-in-part of application No. 14/483,070, filed on Sep. 10, 2014.

(58) Field of Classification Search
USPC .......................................................... 380/28
See application file for complete search history.

(56) References Cited

U.S. PATENT DOCUMENTS

| | | | |
|---|---|---|---|
| 6,487,293 B2 | 11/2002 | Sako et al. | |
| 6,633,980 B1* | 10/2003 | Johnson | H04L 63/068 713/168 |
| 7,010,681 B1* | 3/2006 | Fletcher | H04L 63/0428 713/154 |
| 7,219,223 B1* | 5/2007 | Bacchus | H04L 63/0428 713/150 |
| 7,428,306 B2 | 9/2008 | Celikkan et al. | |
| 8,590,027 B2 | 11/2013 | Rowley | |
| 8,966,267 B1 | 2/2015 | Pahl et al. | |
| 9,531,705 B1 | 12/2016 | Mehner et al. | |
| 2002/0023010 A1 | 2/2002 | Rittmaster et al. | |
| 2002/0095594 A1 | 7/2002 | Dellmo et al. | |
| 2002/0099858 A1 | 7/2002 | Lindo et al. | |
| 2003/0048905 A1 | 3/2003 | Gehring et al. | |
| 2003/0226017 A1* | 12/2003 | Palekar | H04L 63/0428 713/168 |
| 2004/0030896 A1* | 2/2004 | Sakamura | G06Q 20/341 713/169 |
| 2004/0123159 A1 | 6/2004 | Kerstens et al. | |
| 2005/0188193 A1 | 8/2005 | Kuehnel et al. | |
| 2006/0041938 A1 | 2/2006 | Ali | |
| 2006/0045273 A1* | 3/2006 | Mayer | H04L 9/12 380/277 |
| 2006/0098814 A1 | 5/2006 | Al-Khoraidly et al. | |
| 2006/0191002 A1* | 8/2006 | Lee | H04L 63/0428 726/13 |
| 2007/0042769 A1* | 2/2007 | Thommana | H04L 63/0272 455/422.1 |
| 2007/0154018 A1* | 7/2007 | Watanabe | H04L 63/0428 380/273 |
| 2007/0180130 A1* | 8/2007 | Arnold | H04L 69/18 709/230 |
| 2007/0297430 A1 | 12/2007 | Nykanen et al. | |
| 2008/0063192 A1 | 3/2008 | Goubin et al. | |
| 2008/0070571 A1 | 3/2008 | Nguyen et al. | |
| 2008/0072034 A1* | 3/2008 | Lescuyer | H04L 63/0428 713/153 |
| 2008/0123859 A1* | 5/2008 | Mamidwar | H04L 9/0625 380/278 |
| 2008/0126813 A1 | 5/2008 | Kawakami | |
| 2008/0130518 A1 | 6/2008 | Nishikata et al. | |
| 2008/0141313 A1 | 6/2008 | Kato et al. | |
| 2008/0178240 A1* | 7/2008 | Ikeda | H04N 21/4126 725/110 |
| 2008/0313310 A1 | 12/2008 | Vasa et al. | |
| 2009/0059915 A1* | 3/2009 | Baker | H04L 47/10 370/389 |
| 2009/0119503 A1 | 5/2009 | Isaakian et al. | |
| 2009/0276830 A1 | 11/2009 | O'Connor | |
| 2009/0296938 A1* | 12/2009 | Devanand | H04L 9/0631 380/278 |
| 2010/0278338 A1 | 11/2010 | Chang et al. | |
| 2010/0306525 A1* | 12/2010 | Ferguson | H04L 63/0442 713/151 |
| 2011/0093710 A1 | 4/2011 | Galvin et al. | |
| 2011/0113244 A1* | 5/2011 | Chou | H04L 63/166 713/168 |
| 2011/0150223 A1 | 6/2011 | Qi et al. | |
| 2011/0252227 A1 | 10/2011 | Strong et al. | |
| 2011/0280406 A1 | 11/2011 | Ma et al. | |
| 2012/0077461 A1* | 3/2012 | Das | H04L 63/0884 455/410 |
| 2013/0007434 A1 | 1/2013 | King et al. | |
| 2014/0012674 A1 | 1/2014 | Piccionielli et al. | |
| 2014/0013101 A1 | 1/2014 | Tanizawa et al. | |
| 2014/0013420 A1 | 1/2014 | Picionielli et al. | |
| 2014/0067996 A1 | 3/2014 | Zhang | |
| 2014/0164768 A1* | 6/2014 | Kruglick | H04L 63/062 713/168 |
| 2014/0304415 A1 | 10/2014 | Prakash et al. | |
| 2015/0058913 A1* | 2/2015 | Kandasamy | H04L 63/061 726/1 |
| 2015/0113172 A1* | 4/2015 | Johnson | H04L 67/34 709/245 |
| 2015/0113277 A1 | 4/2015 | Harkins | |
| 2015/0288514 A1 | 10/2015 | Pahl et al. | |
| 2015/0303964 A1* | 10/2015 | Shriya | H04L 63/0861 455/558 |
| 2015/0341317 A1* | 11/2015 | Zombik | H04L 63/0245 713/151 |
| 2015/0382189 A1* | 12/2015 | Zhang | H04W 12/04 380/285 |
| 2016/0021110 A1* | 1/2016 | Sugano | H04L 63/0823 713/156 |
| 2016/0080940 A1 | 3/2016 | Pang et al. | |

OTHER PUBLICATIONS

Chown et al., "Advanced Ecryption Standard (AES) Ciphersuites for Transport Layer Security (TLS)," The Internet Society, Network Working Group Request for Comments: 3268, Category: Standards Track, Jun. 2002, 7 pages.

Dierks et al., "The TLS Protocol: Version 1.0," The Internet Society, Network Working Group Request for Comments: 2246, Category: Standards Track, Jan. 1999, 80 pages.

Dierks et al., "The Transport Layer Security (TLS) Protocol: Version 1.2," Network Working Group Request for Comments: 5246, Category: Standards Track, Aug. 2008, 104 pages.

Eronen et al., "Pre-Shared Key Ciphersuites for Transport Layer Security (TLS)," The Internet Society, Network Working Group Request for Comments: 4279, Category: Standards Track, Dec. 2005, 15 pages.

Glenn et al., "The NULL Encryption Algorithm and Its Use With IPsec," Internet Engineering Task Force (IETF) Request for Comments: 2410, Category: Standards Track, Nov. 1998, 6 pages.

Turner et al., "Prohibiting Secure Sockets Layer (SSL) Version 2.0," IETF Trust, Internet Engineering Task Force (IETF) Request for Comments: 6176, Mar. 2011, 4 pages.

* cited by examiner

SECURE TRANSPORT CHANNEL USING MULTIPLE CIPHER SUITES

CROSS-REFERENCE TO RELATED APPLICATIONS

This application is a continuation of U.S. patent application Ser. No. 14/720,625, filed May 22, 2015, entitled "SECURE TRANSPORT CHANNEL USING MULTIPLE CIPHER SUITES," which is a continuation-in-part of U.S. patent application Ser. No. 14/483,070, filed on Sep. 10, 2014, entitled "CRYPTOGRAPHY ALGORITHM HOPPING," and U.S. patent application Ser. No. 14/483,071, filed on Sep. 10, 2014, entitled "COMMUNICATION CHANNEL SECURITY ENHANCEMENTS," the contents of which are incorporated by reference herein in their entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Modern cryptographic algorithms provide high levels of data security. Current encryption methods, for example, can secure data such that unauthorized access to the data requires an impractical amount of time and/or resources. Such high-levels of protection, however, come at a cost. Generally speaking, higher levels of protection require higher levels of care and greater expenditure of computational resources. At the same time, not all transactions, however, require the highest available levels of security. Furthermore, the computational resources required to perform higher levels of encryption may be a performance constraint, for example, on older devices, mobile devices, and embedded, connected, and sensor devices. As an example, data is often communicated from one computer to another using hypertext transfer protocol secure (HTTPS), even when the data is publicly available. Generally, excessive amounts of computational resources are spent unnecessarily, resulting in higher latencies, higher energy usage, among other issues.

BRIEF DESCRIPTION OF THE DRAWINGS

Various embodiments in accordance with the present disclosure will be described with reference to the drawings, in which.

DETAILED DESCRIPTION

Figure 1:
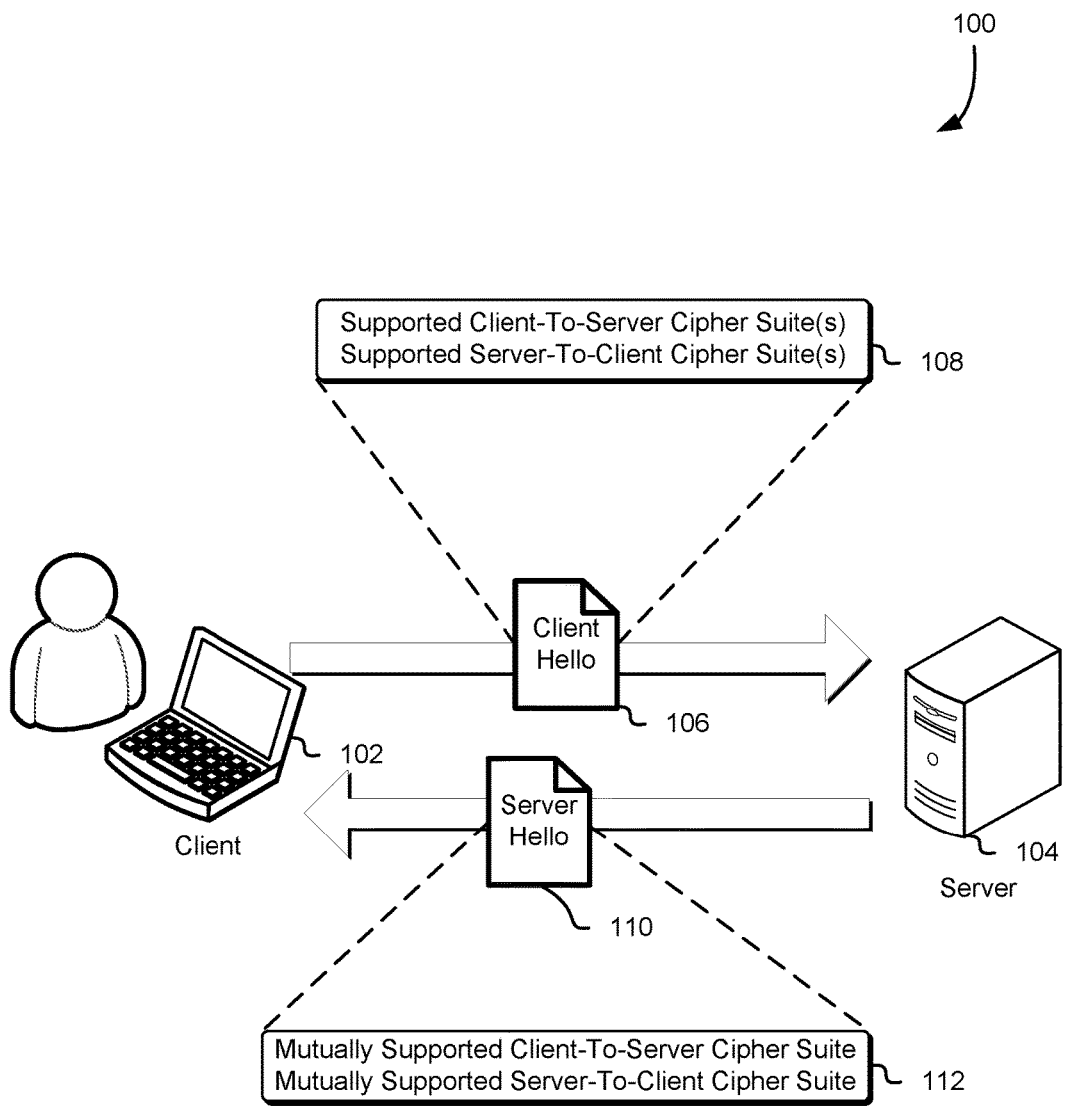
FIG. 1 shows an illustrative example of a client and server negotiating a handshake process.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein involve dynamic cipher suite selection based on planned session use. In some examples, during a handshake negotiation process to establish a cryptographically protected communications session, a client indicates to a server a list of cipher suites to the client for use in client-to-server communications and a second list of cipher suites suitable to the client for use in server-to-client communications. The server then selects mutually acceptable cipher suites for both client-to-server communications and server-to-client communications. The cipher suites selected for server-to-client and client-to-server communications over the cryptographically protected communications session may be different cipher suites.

For example, a client may be configured to request sensitive data on a server where the request itself is not required to be confidential. In such an example, the client-to-server cipher suite may be selected in a manner that that favors cipher suites with better performance characteristics while still meeting certain minimum assurances required to be cryptographically protected (e.g., the integrity and authenticity of the client request must be verifiable). Additionally, the server may have a list of acceptable client-to-server cipher suites (e.g., to restrict the use of compromised encryption algorithms). Additionally, the server may have a list of acceptable client-to-server cipher suites (e.g., to restrict the use of compromised encryption algorithms). In such an example, cipher suites acceptable for selection may be restricted to cipher suites that are mutually supported— that is, for a cipher suite to be selected, it must both be in the server's list of acceptable client-to-server cipher suites and the client's list of client-to-server cipher suites suitable for communication over the cryptographically protected communications session.

Continuing with the example, the cipher suite to be used for the server response over the cryptographically protected communications session may be selected in a manner that favors cipher suites with stronger cryptographic properties (e.g., larger key sizes, stronger cryptographic algorithms, algorithms that are provably secure, and the like) based at least in part on the server response including sensitive information. Sensitive information can be any information that an entity desires to limit access to and may include credit card numbers, social security numbers, passwords, personally identifiable information (PII), protected health information (PHI)), media protected by Digital Rights Management (DRM) software, and more. Additionally, the server may have a list of acceptable server-to-client cipher suites (e.g., to restrict the use of compromised encryption algorithms). In this example, cipher suites acceptable for selection may be restricted to cipher suites that are mutually supported. It should be noted that the client-to-server cipher suite and server-to-client cipher suite may use different cryptographic algorithms (e.g., Advanced Encryption Standard (AES) and Data Encryption Standard (DES)), have different cryptographic properties (e.g., block ciphers and stream ciphers), may provide different cryptographic assurances (e.g., having integrity, authenticity, and confidentiality for the first cipher suite but only integrity and authenticity for the second cipher suite).

Continuing with the previous example, the server then selects a cipher suite appropriate to the client's planned use of the session and completes the handshake accordingly. The server may be configured to select a cipher suite with cryptographic properties appropriate to the planned use. Cipher suite(s) appropriate to a particular planned use may be a configurable setting and, in some examples, a setting that is configurable through application programming interface (API) requests. These settings may be stored within a policy repository that is accessible through a policy management service.

Upon completion of the handshake, the client and server may use the cryptographically protected communications session to communicate with each other. Messages (e.g., requests) sent by the client to the server over the cryptographically protected communications session may use the client-to-server cipher suite, and messages (e.g., responses) sent by the server to the client may be sent using the server-to-client cipher suite. Such a configuration may achieve higher bandwidth, better performance, better battery life, better end-user experience (e.g., in the case of streaming DRM-enabled media, decreased or eliminated buffering) based at least in part on the selection of cipher suites that are computationally performant. For example, a client that makes several requests containing small amounts of data (e.g., a request to purchase and view DRM-media such as a movie) may be submitted using a first cipher suite having a particularly strong encryption algorithm (e.g., to ensure the security of the requestor's payment credentials used to make the purchase) and a response including a digital media stream may be provided to the client using a second cipher suite that both includes an acceptable encryption algorithm (e.g., sufficient for protecting DRM-enabled media) and an acceptable bitrate for streaming (e.g., the bitrate of digital media stream provided to the client in a manner that results in little or no buffering of digital media content).

In some examples, the handshake process may be implemented in a manner allowing for the client to provide connection metadata. Connection metadata may be usable by the service in selecting a client-to-service cipher suite, a service-to-client cipher suite, or both and may include, for example, latency with the server, upstream/downstream connection bandwidth to/from the service, geolocation context (e.g., global positioning satellite (GPS) coordinates or geopolitical context). Furthermore, connection metadata may include information about the client device itself that may be useable in selection of an appropriate cipher suite, such as the type of central processing unit (CPU) in the client device, the type of trusted platform module (TPM) on the client device (if any), or other hardware information that may be usable in the selection of a cipher suite (e.g., the type of CPU may be usable by the server to exclude certain cipher suites from being used because they are too computationally expensive to use in a particular setting, such as real-time streaming of DRM-enabled media; the presence of a TPM on the client device may be usable by the server to select certain cipher suites).

Additionally, the connection metadata may include information at a higher level of abstraction, such as the model ID of the client hardware device (e.g., a set-top box capable of streaming DRM-enabled media having model ID "XYZ-123") or a type of internet connection (e.g., metadata stating that the client is connected via a cable broadband connection, fiber optic broadband connection, 3G wireless connection, local area network (LAN) connection, etc.) that may be used by the server to determine what cipher suites are supported by the client.

In an example, the client provides a set of cipher suites and use contexts for the cipher suites to the server. The use contexts may, for example, may simply be for outgoing and incoming transmissions (as described above) but may also be used to describe other use contexts. For example, a use context may include different classifications of data with respect to the privacy or sensitivity of the data. In an embodiment, a client may specify a first cipher suite for making requests to a server wherein requests contain no sensitive information that requires assurance of confidentiality (e.g., a request to load a webpage), a second cipher suite for receiving response data that requires assurances of confidentiality (e.g., a request to load a client's profile information may include information that should not be transmitted over plaintext), and a third cipher suite for receiving sensitive data included on the webpage (e.g., a stronger cipher suite for transmitting a client's social security number).

Techniques described and suggested herein also enhance the security of communications over secure channels by increasing the difficulty of obtaining plaintext information about the secure channels. Specifically, the techniques described and suggested herein limit the usefulness of any information gained about a secure channel by enabling parties to securely switch to a new secure channel about which plaintext information has lower availability. In some examples, a client and server negotiate a secure communications channel, such as by performing a Transport Layer Security (TLS) handshake. Once the secure communications channel has been established, details about a new secure communications channel may be communicated to the client and server by a third party computer system (referred to, succinctly, as a "third party"). Once both the client and server have received details about the new secure channel from the third party, the client and server may establish the new secure channel for further communications. In this manner, an advantage to data security is achieved since, to obtain information about the second channel, potential attackers would need access to communications with the third party as well as communications between the client and server, which is substantially more difficult to obtain than access to communications between a single pair of parties.

These and other technical advantages are achieved in a wide variety of embodiments. In some examples, the server selects a third party from multiple third parties that are available to use. The server then may, over the secure channel that has been established, communicate the identity of the selected third party to the client. Both the client and the server can obtain parameters for a new encrypted channel from the third party and use those parameters to initiate a new secure channel between the client and server without having to communicate the parameters over the initial secure channel or in plaintext form. In some embodiments, the server has a virtual private network (VPN) or other secure connection to the third party. The client may perform a handshake process with the third party to establish a secure channel over which the parameters can be communicated to the client.

In some embodiments, the server selects the third party in a manner that further enhances data security. For example, in some embodiments, a geographic location of the server, third party, and/or client may be taken into account for the selection. In this manner, the probability of a potential attacker being able to physically access two out of the three entities to determine how to decrypt data encrypted over the new secure channel is substantially reduced. As another example, in some embodiments, the third party is selected as having an ability to communicate with the client over a short-range communication channel and/or over a local area network in which the client is located but which the server is not located. In this manner, the probability of a potential attacker being able to intercept communications from the client to the third party is greatly reduced, since such interceptions would generally require geographic proximity to the client.

The techniques described and suggested herein also provide further security enhancements through varying use of different cryptographic algorithms. In some embodiments, a client and server share a cryptography algorithm hopping model that indicates to both the client and the server how to move among cryptographic algorithms over time. The cryptography algorithm hopping model (hopping model) may take various forms in accordance with various embodiments. Generally, the hopping model describes parameters for a cryptography algorithm hopping algorithm (hopping algorithm), which is an algorithm for changing cryptographic algorithms. A cryptography algorithm hopping model may specify a plurality of cryptography algorithms and information sufficient to determine a sequence of the plurality of cryptography algorithms and to determine when to switch from one cryptography algorithm in the sequence to the next cryptography algorithm in the sequence, such as described below. In some examples, the hopping model is configured such that switches between cryptographic algorithms occur in fixed or variable time intervals. As another example, the switches between cryptographic algorithms may be based at least in part on the content of transferred messages or other contextual data (such as the number of messages transferred or the time of transfer). In some embodiments, the hopping model specifies one of multiple hopping algorithms that are available for use. In some embodiments, a cryptography algorithm hopping model references one or more other cryptography algorithm hopping models, thereby causing the model to cause cryptography algorithm hopping by causing hopping among a plurality of cryptography algorithm hopping models.

The mechanism by which the client and server communicate a hopping model varies in accordance with various embodiments. In some examples, the hopping model is communicated offline or through a different communication channel. In some embodiments, the hopping model is negotiated over a secure channel after an initial handshake protocol is completed to establish the secure channel. As yet another example, the hopping model may be negotiated during a handshake using a model identifier that references a pre-shared secret hopping model. Other variations are also considered as being within the scope of the present disclosure including, but not limited to, variations discussed below.

FIG. 1 shows a diagram 100 illustrating a context in which various techniques of the present disclosure may be utilized. In this particular example, the diagram 100 shows a client 102 and a server 104 performing a handshake. The handshake may be initiated in response to a user input to the client 102 or may be automatic (e.g., setup as part of an HTML request). The client 102 may transmit a ClientHello message 106 to the server 104 to initiate a handshake process to establish a cryptographically protected communications channel over which resources may be transferred.

A cipher suite, in an embodiment, is a collection of cryptographic algorithms, each for a different cryptographic protection. In some examples, a cipher suite comprises an authentication algorithm, an encryption algorithm, a message authentication code (MAC) algorithm, and a key exchange algorithm. Other variations of cipher suites may be within the spirit of the disclosure and may include, more generally, collections of one or more cryptographic ciphers and other algorithms usable to secure data. In various embodiments, instead of naively selecting the most secure cipher suite mutually supported by a client and a server, the techniques of the present disclosure allow for efficiency gains by allowing for selection of cipher suites that are more appropriate for communications that will traverse the network.

In various embodiments cryptographically protected communications sessions are used for the purpose of accessing resources. The cryptographically protected communications sessions may be used for example, for the transfer of data from one entity to another such as from a client to a server or from the client to the server. The cryptographically protected communications session may be used for instance to ensure integrity of the data traversing a network between the entities and/or to ensure confidentiality of the data as it traverses the network.

In some embodiments, the client 102 and server 104 may negotiate, during the handshake process of a protocol for establishing cryptographically protected communications sessions, a plurality of cipher suites supported by a remote computer system (e.g., the client). It should be noted that remote computer systems refer to computer systems that can be logically isolated. For example, a personal computer used by an end-user may be a remote computer system with respect to a server in a data center. However, a remote computer system may not necessarily be physically isolated—for example, a virtual machine instance (VMI) located within a data center may, for the purposes of this disclosure, be a remote computer system with respect to a server located within the same data center or even a server hosted within the same host machine. Accordingly, the ClientHello message 106 may specify a set of cipher suites supported by the client for transmitting messages to the server (i.e., a set of supported client-to-server cipher suites) and a set of cipher suites supported by the client for receiving message from the server (i.e., a set of supported server-to-client cipher suites). In some embodiments, a set may include exactly one cipher suite. In many embodiments, the set of supported client-to-server cipher suites and set of supported server-to-client cipher suites may be distinct, but in some embodiments, the sets may include the same cipher suites, that is, the same cipher suites are supported for both client-to-server communications and server-to-client communications. In some embodiments, the sets may include the same cipher suites but in a different ordering or ranking.

In an embodiment, the server receives the ClientHello message 106, obtains the client's supported cipher suites 108 and determines the server's set of supported cipher suites for client-to-server and server-to-client messages (not shown in FIG. 1). The server then selects a mutually supported client-to-server cipher suite and a mutually selected server-to-client cipher suite, both of which may be used for cryptographically protected communications between the server and client. A mutually supported cipher suite may be a cipher suite that is supported both by the server and the client for an intended use—in the present embodiment, a cipher suite that the client supports for client-to-server messages and the server supports for client-to-server messages is mutually supported. Where multiple cipher suites are mutually supported, various methods may be used to select one of the mutually supported cipher suites. As an example, a list of supported cipher suites may be strictly ordered and/or ranked and the highest ranked mutually supported cipher suite is selected. In some embodiments, the client and server lists may both be ranked, and various methods may be used to select a cipher suite—the highest ranked cipher suite from the client list may be selected, the highest ranked cipher suite from the server list may be selected, or a weighted selection based on the cipher suite's rank in both lists may be used.

In some embodiments, a mutually supported cipher suite may not exist, for example, where an older device does not support newer encryption capabilities required by a service. In such an embodiment, the server may send the client an indication that the handshake failed (e.g., an error message) or may attempt to re-negotiate the handshake with the client or, in some embodiments, complete the handshake but limit access to data.

In some examples, a mutually supported client-to-server cipher suite and mutually supported server-to-client cipher suite 112 may be selected and provided to the client 102, for example, in a TLS ServerHello 110. The client may use this information to complete the handshake, and upon completion, the server and client may communicate with each other over a cryptographically protected communications session using the selected cipher suites.

In an example embodiment, the cryptographically protected communications session is used to streams encrypted media from the server to the client. The set of client supported cipher suites may include cipher suites which the client device is capable of decrypting at a rate quicker than it is receiving the media (e.g., to avoid buffering) and the set of server supported cipher suites may include cipher suites which the server is capable of encrypting at a rate quicker than the client expects to receive the media (e.g., so that the media plays smoothly). It should be appreciated that in the embodiment, the client and server support cipher suites based on different use contexts—the client's use contexts include decryption, whereas the server's use contexts include encryption.

Figure 2:
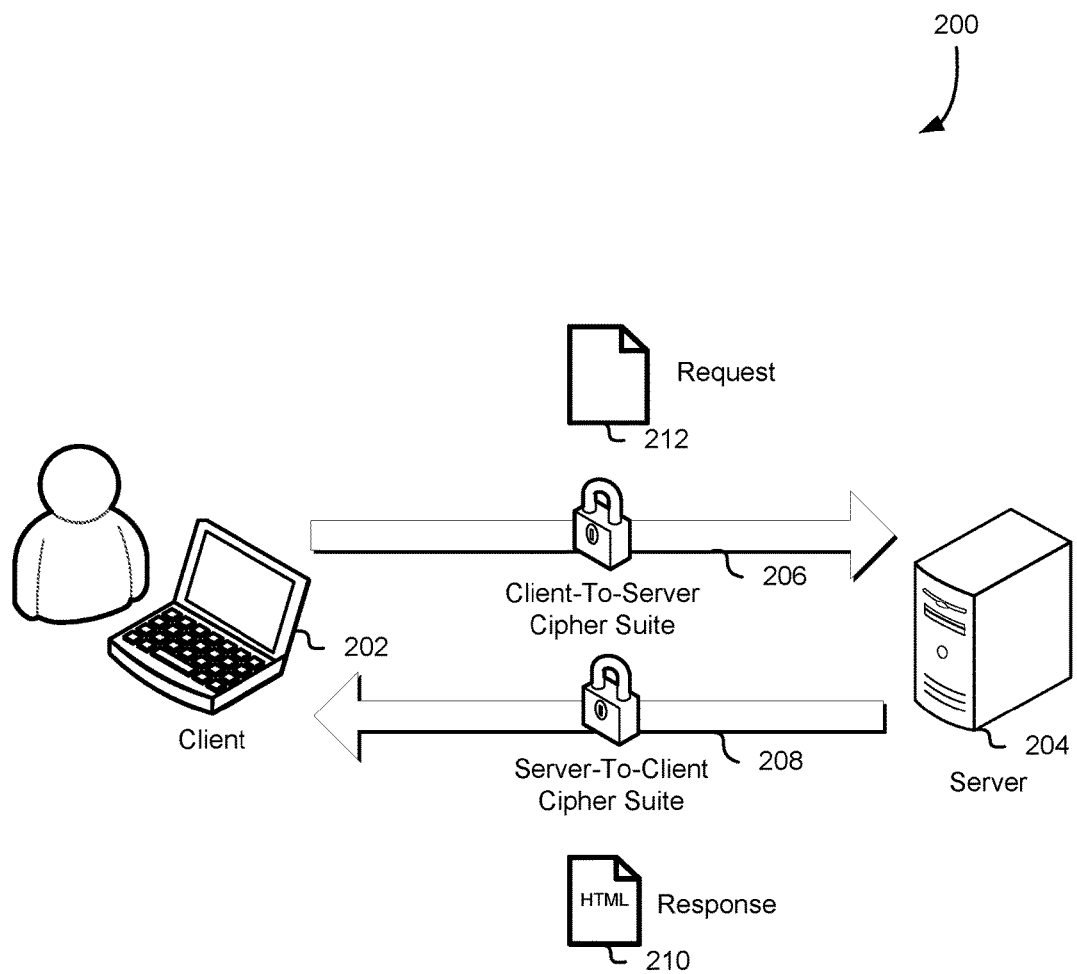
FIG. 2 shows an illustrative example of a request and response in accordance with an embodiment.

FIG. 2 shows a diagram 200 illustrating a context in which various techniques of the present disclosure may be utilized. In this particular example, the diagram 200 shows a client 202 and a server 204 which may be the client and server such as described above in connection with FIG. 1. In an embodiment, the client 202 and server 204 complete a handshake process, for example as described above in connection with FIG. 1. The client 202 may send a request 212 to the server over the cryptographically protected communications session using the client-to-server cipher suite 206 negotiated by the client and server during the handshake. In response, the server 204 transmits a hypertext markup language (HTML) document 210 to the client 202. As illustrated in FIG. 2, the HTML document 210 may include various information such as HTML code and part of the HTML code may include server-to-client cipher suite 208.

Either automatically or in response to user input, the client 202 may transmit a ClientHello message to the server 204 to initiate a handshake process to establish a cryptographically protected communications channel over which the resource identified by the request 212 should be transferred. Accordingly, the ClientHello message may specify a set of supported cipher suites for client-to-server communication and server-to-client communication, that is, a set of cipher suites supported by the client 202, and an extension to the ClientHello message may specify the request 212 thereby indicating to the server 204 a planned use of a cryptographically protected communications session to be established between the client 202 and the server 204. The ClientHello message may, for instance, include the request in plaintext, provide an encrypted copy of the request (decryptable by the server, for instance, by being encrypted using a public cryptographic key of a public-private key pair associated with the server), provide an anonymized request that is generated based at least in part on the request, and/or other information specific to the request.

Figure 5:
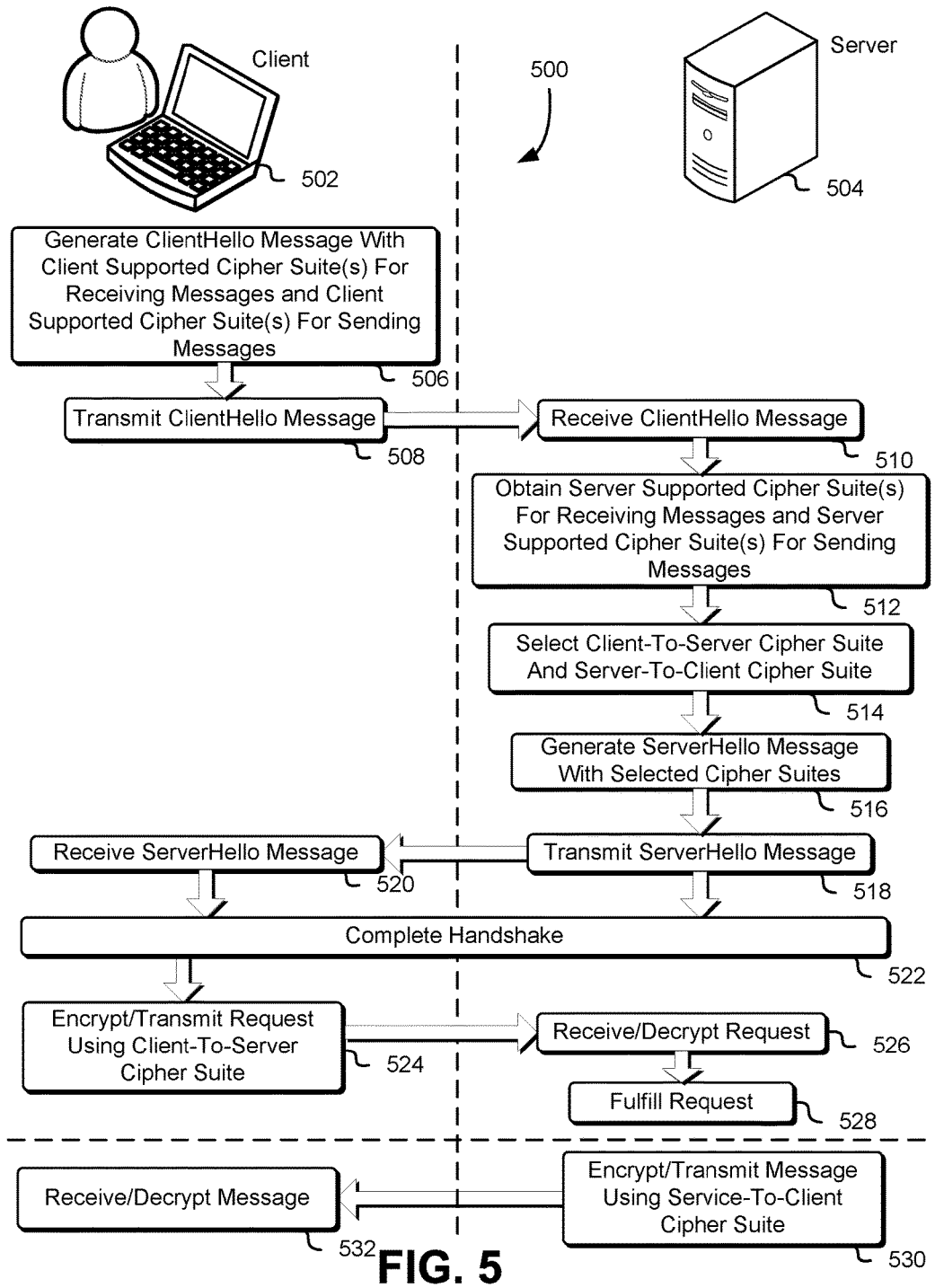
FIG. 5 shows a diagram illustrating communications between a client and a server in accordance with an embodiment.

The server 204 may receive the ClientHello message and may complete a handshake process with the client 202 such as in accordance with FIG. 5. The server 204, assuming successful completion of the handshake process, may establish a cryptographically protected communications channel with the client 202, and may transfer the HTML response to the client 202 over a network for rendering by the client 202 or other processing, which may be dependent on how the response is encoded in the HTML document 210 and also dependent on programming logic of the client 202.

Numerous variations of the example illustrated in FIG. 2 are considered as being within the scope of the present disclosure. For example, in some examples, a request may include a request for multiple HTML pages, images, and URLs that are encoded on web pages. A client may be configured to aggregate such content into a single ClientHello message (e.g., in a list). The client may use each of the content types in determining the set of client supported cipher suites. As noted above, each corresponding resource may have a corresponding set of preferences and a different mutually supported cipher suite may be most preferred for different resources. The client may be configured with a global ranking of preferences, for instance, based at least in part on cryptographic strength. In such instances, the client may first determine a most preferred cipher suite for each of the references corresponding to the resources (thereby obtaining a set of cipher suites supported amongst the resources in the request), then use the global ranking to order those obtained cipher suites supported amongst the resources in the request.

As yet another example considered as being within the scope of the present disclosure, the client 202 may establish multiple transmission control protocol (TCP) connections with the server 204 and may use different TCP sessions for different planned uses. In this manner, the client can establish different cryptographically protected communications sessions over different TCP connections and use each session for a different planned use (e.g., allocating requests according to planned use), thereby gaining efficiencies by more closely matching requests to cipher suites most appropriate for the requests.

As noted above, various techniques of the present disclosure involve selectively providing access to resources based at least in part on cipher suites that have been negotiated. Further as noted above in some examples, requests may be denied as a result of a cipher suite that was negotiated being insufficient for fulfillment of a request. Various techniques of the present disclosure allow for flexibility and dynamic changing of cipher suites so as to provide more flexibility while still maintaining efficiencies gained through the various techniques described herein.

Figure 3:
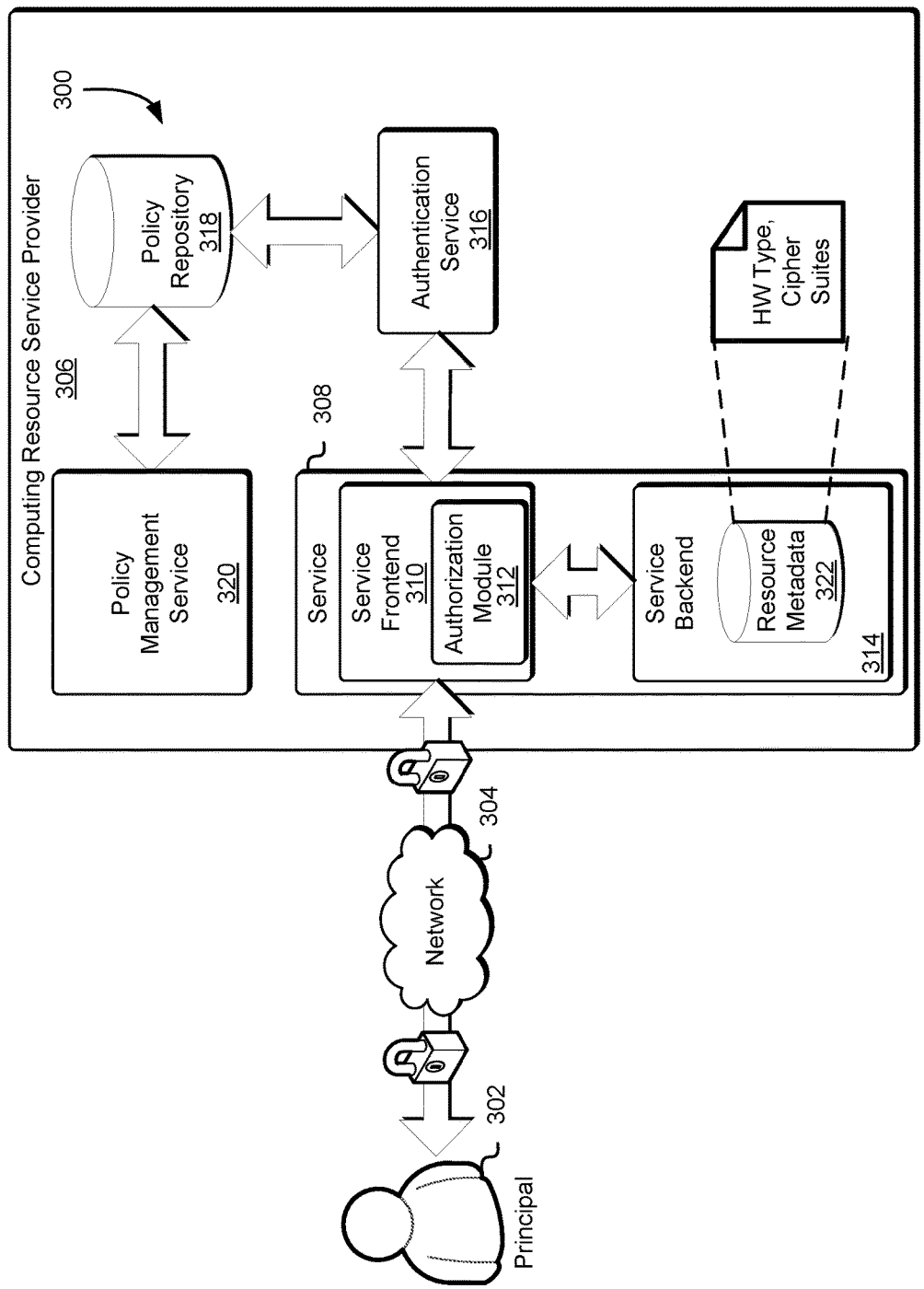
FIG. 3 shows an illustrative example of an environment in which various embodiments can be implemented.

FIG. 3 is an illustrative example of an environment 300 in which various embodiments of the present disclosure can be practiced. In an embodiment, a principal 302 may use a computing device to communicate over a network 304 with a computing resource service provider 306. Communications between the computing resource service provider 306 and the principal 302 may, for instance, be for the purpose of accessing a service 308 operated by the computing resource service provider 306, which may be one of many services operated by the computing resource service provider 306. The service 308 may comprise a service frontend 310 and a service backend 314. The principal 302 may issue a request for access to a service 308 (and/or a request for access to resources associated with the service 308) provided by a computing resource service provider 306. The request may be, for instance, a web service application programming interface request. The principal may be a user, or a group of users, or a role associated with a group of users, or a process representing one or more of these entities that may be running on one or more remote (relative to the computing resource service provider 306) computer systems, or may be some other such computer system entity, user, or process. Generally, a principal is an entity corresponding to an identity managed by the computing resource service provider, where the computing resource service provider manages permissions for the identity. Note, however, that embodiments of the present disclosure extend to identities not managed by the computing resource service provider, such as when identities are anonymous or otherwise unspecified. For example, a policy may apply to anonymous principals.

The principal 302 may correspond to an identity managed by the computing resource service provider 306, such as by the policy management service or another service. The identity may be one of multiple identities managed for an account of a customer of the computing resource service provider, and the computing resource service provider may manage accounts for multiple customers. Note that, while the principal 302 may correspond to a human, such a human may communicate with the computing resource service provider 306 through a suitably configured computing device which may perform operations (e.g., generation and transmission of requests) on behalf of the principal 302. The principal 302 may communicate with the computing resource service provider 306 via one or more connections (e.g., transmission control protocol (TCP) connections). The principal 302 may use a computer system client device to connect to the computing resource service provider 306. The client device may include any device that is capable of connecting with a computer system via a network, such as example devices discussed below. The network 304 may include, for example, the Internet or another network or combination of networks discussed below.

The computing resource service provider 306, through the service 308, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments. Note that such services and resources are provided for the purpose of illustration and embodiments of the present disclosure may utilize other services and/or resources.

The request for access to the service 308 which, in some examples, is a web service application programming interface request (also referred to simply as a web service request), may be received by a service frontend 310. The service frontend 310 may be a system comprising a set of web servers (e.g., a single web server or a set of web servers which may be managed by a load balancer). Web servers of the service frontend 310 may be configured to receive such requests and to process them according to one or more policies associated with the service 308. Web servers or other components of the service frontend 310 may be configured to operate in accordance with one or more SSL and/or TLS protocols, such as referenced herein. The request for access to the service 308 may be a digitally signed request and, as a result, may be provided with a digital signature. The service frontend 310 may then send the request and the digital signature for verification to an authentication service 316. The authentication service 316 may be a stand-alone service or may be part of a service provider or other entity. The authentication service 316, in an embodiment, is a computer system configured to perform operations involved in authentication of principals. In some examples, requests submitted to the service frontend 310 are digitally signed by the principal (i.e., by a computing device used by or operating on behalf of the principal) using a symmetric cryptographic key that is shared between the principal 302 and the authentication service 316. The authentication service, therefore, may use a copy of the symmetric cryptographic key to verify digital signatures of requests purported to have been generated by the principal 302. However, in other embodiments, the authentication service 316 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 302 corresponding to the private cryptographic key. Consequently, in some embodiments, the authentication service may use a public cryptographic key specified by the certificate. Generally, the authentication service may utilize a cryptographic key that is registered with the authentication service 316 in association with the principal 302.

Upon successful authentication of a request, the authentication service 316 may then obtain policies applicable to the request. A policy may be a set of information that defines a set of permissions with respect to a set of resources. The policy may be applicable to the request by way of being associated with the principal 302, a resource to be accessed as part of fulfillment of the request, a group in which the principal 302 is a member, a role the principal 302 has assumed, and/or otherwise. To obtain policies applicable to the request, the authentication service 316 may transmit a query to a policy repository 318 managed by a policy management service 320, which may be the policy management service discussed above. The query may be a request comprising information sufficient to determine a set of policies applicable to the request. The query may, for instance, contain a copy of the request and/or contain parameters based at least in part on information in the request, such as information identifying the principal, the resource, and/or an action (operation to be performed as part of fulfillment of the request). The policy repository, which may be a database or other system operable to process queries, may process the query by providing any policies applicable to the request. Note that, if authentication of the request is unsuccessful (e.g., because a digital signature could not be verified), policies applicable to the request may not be obtained.

Having obtained any policies applicable to the request, the authentication service 316 may provide an authentication response and, if applicable (e.g., when there is a positive authentication response), the obtained policies back to the service frontend 310. The authentication response may indicate whether the response was successfully authenticated. The service frontend 310 may then check whether the fulfillment of the request for access to the service 308 would comply with the obtained policies using an authorization module 312.

An authorization module 312 may be a process executing on the service frontend that is operable to compare the request to the one or more permissions in the policy to determine whether service is authorized to satisfy the request (i.e., whether fulfillment of the request is authorized). For example, the authorization module may compare an API call associated with the request against permitted API calls specified by the policy to determine if the request is allowed. If the authorization module 312 is not able to match the request to a permission specified by the policy, the authorization module 312 may execute one or more default actions such as, for example, providing a message to the service frontend that causes the service frontend to deny the request, and causing the denied request to be logged in the policy management service 320. If the authorization matches the request to one or more permissions specified by the policy, the authorization module 312 may resolve this by selecting the least restrictive response (as defined by the policy) and by informing the service frontend whether the fulfillment of the request is authorized (i.e., complies with applicable policy) based on that selected response. The authorization module 312 may also select the most restrictive response or may select some other such response and inform the service frontend whether the fulfillment of the request is authorized based on that selected response. Note that, while FIG. 3 shows the authorization module 312 as a component of the service frontend 310, in some embodiments, the authorization module 312 is a separate service provided by the computing resource service provider 306 and the frontend service may communicate with the authorization module 312 over a network.

In an embodiment, the service backend 314 maintains a repository 322 of resource metadata (resource metadata repository) that contains metadata about the resources managed by the service 308. The metadata may contain various information about the resources, which may depend on the specific type(s) of resources managed by the service 308. Metadata may include, for instance, size of data objects, numbers of data objects in logical data containers, lifecycle information, such as creation dates, edit dates, and other dates, and other information that may be relevant to the resources managed by the service 308. In some embodiments, the resource metadata contains access control information (e.g., policies) additional to access control information stored in policies in the policy repository. The service frontend 310 may be configured to, when a request is received from the principal 302, query the service backend 314 for any applicable access control information and use any returned access control information in determining whether and/or how to fulfill a request. As with access control information discussed above (e.g., policies), access control information may contain conditions associated with resources and/or principals that define rules for access of the resources.

In some examples, access control information stored in a policy or resource metadata repository is associated with resources and specifies a set of cipher suites suitable for the resources. For a particular resource, the access control information may specify or otherwise indicate a set of cipher suites such that, to fulfill an API request received over a cryptographically protected communications session and involving the resource, the cryptographically protected communications session must utilize a cipher suite in the set. The set may be specified explicitly (e.g., with an identifier for each cipher suite in the set and/or an identifier for the set), implicitly (e.g., with a security level for the resource), and/or otherwise. As with other access control information, the access control information may specify conditions involving when requirements regarding cipher suites apply, such as which API requests the requirements apply to (i.e., which type(s) of requests), which may be all API requests whose fulfillment involves access to the resource, which principals the requirements apply to (which may be all principals), and other requirements. In some examples, access control information specifies conditions involving contextual information which, for an API request, which may include a source network address (e.g., source Internet Protocol (IP) address), a time of day when the request is submitted, a network from which the request is submitted (e.g., an identifier of a private network or a subnet of a private network), and other information. In one example, a source network address of an API request may be mapped to a geographic location (which may be defined in various ways, such as in accordance with geopolitical boundaries and/or legal jurisdictions) and applicability of one or more conditions may apply to the geographic location. For instance, certain geographic locations may require certain cipher suites be in use for fulfillment of certain requests (e.g., requests whose fulfillment involves access to certain resources). In some examples, a set of cipher suites may be associated with certain hardware configurations, for example, based on a CPU identifier or a hardware model identifier.

Note that, while FIG. 3 shows a particular configuration of a distributed system of a computing resource service provider, other configurations are also considered as being considered within the scope of the present disclosure. For example, authentication and authorization determinations may be made by different components of a distributed system (e.g., the service frontend 310). As another example, applicable request-mapping rules and authorization rules may be stored in the policy repository and part of obtaining applicable policy may include application of the request-mapping rules to determine the proper authentication rules.

Figure 4:
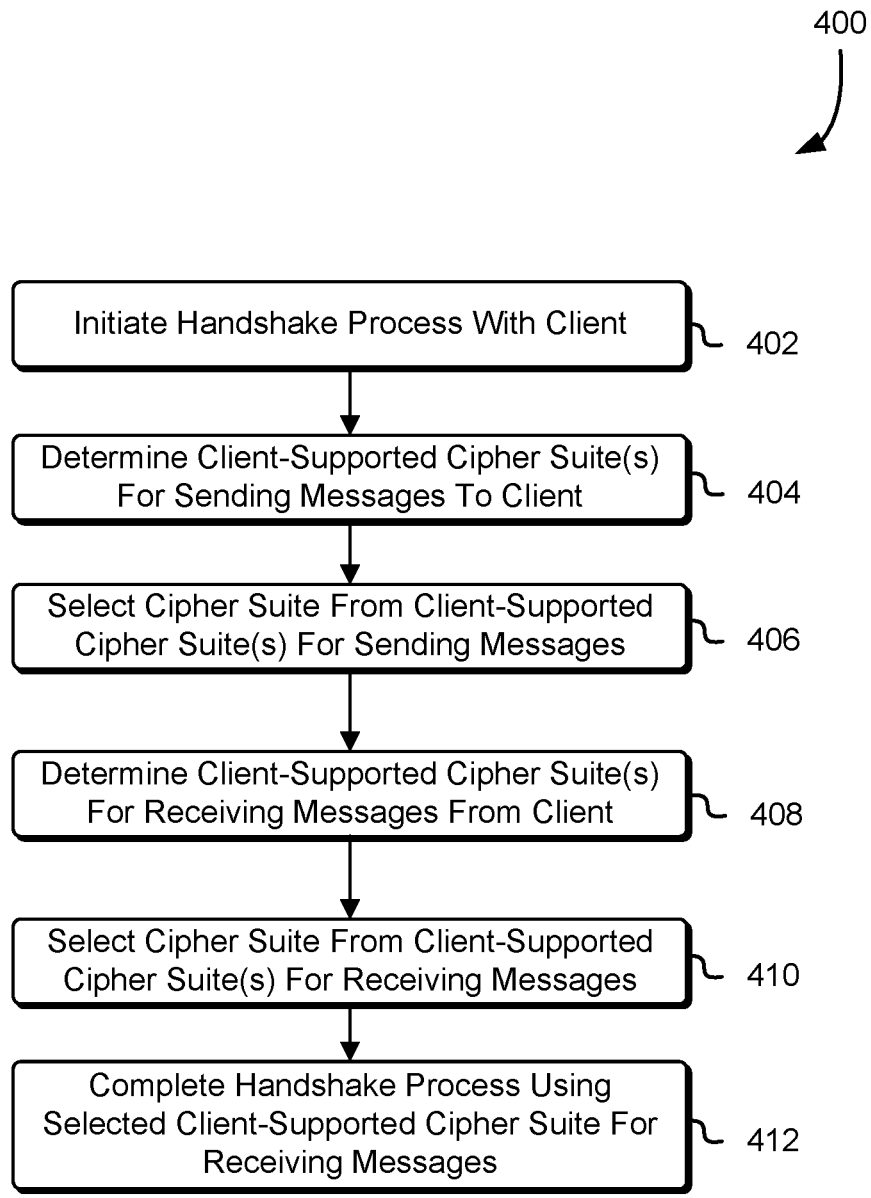
FIG. 4 shows an illustrative process for negotiating a handshake process in accordance with an embodiment.

FIG. 4 shows an illustrative example of a process 400 for performing a handshake in accordance with an embodiment. The process 400 may be performed by any suitable system such as a server computer system of a service front end such as described above in connection with FIG. 3. Note however, that the process 400 may be performed by any computer system that participates in a handshake process. Also note the handshake process may be any handshake for establishment of a cryptographically protected communications session, such as a protocol for a cryptographically protected communications session which includes a handshake protocol and a record protocol. In an embodiment, a system performing the process 400 initiates 402 a handshake process with a client. The handshake process may be initiated 402 in various ways in accordance with various embodiments, and generally the way by which the handshake process is initiated 402 may vary in accordance with a particular protocol of which the handshake process is a part. In a specific example, the system performing the process 400 initiates 402 the handshake process by receiving a ClientHello message from the client. The ClientHello message may list for example, a set of cipher suites supported by the client for client-to-server communications and a set of cipher suites supported by the client for server-to-client communications where the sets respectively may have a single cipher suite specified or may have multiple cipher suites specified. Generally, the handshake process may be initiated 402 by receiving or transmitting a message that causes the handshake process to initiate.

The process 400 may include determining 404 a set of client-supported cipher suites for sending messages to the client (i.e., server-to-client communications). In some examples, the set of client-supported cipher suites is specified in a ClientHello or other message received from the client. Note however that other ways of determining a set of client supported cipher suites may be used (e.g., by referring to a database that associates client identifiers with supported cipher suites). Once a system performing the process 400 determines 404 a set of client supported cipher suites for sending messages to the client, the process 400 may include selecting 406 a cipher suite from the set of client supported cipher suites. The selecting 406 of a cipher suite or sending messages to the client may be achieved using various methods. For example, the service may have a list of cipher suites supported by the service for sending messages to the client which may be based at least in part on various factors such as the hardware configuration of the client, the use context, latency, or other metadata. The selecting 406 of a cipher suite may be performed such that the cipher suite is a mutually supported cipher suite that is both supported by the client in accordance with the set of supported client cipher suites in accordance with the determination 404 and is a supported cipher suite in accordance with the server's list of supported cipher suites. Where there are multiple mutually supported cipher suites, those cipher suites may be ranked and selected based at least in part on the client list, the server list, or a weighted combination of both lists.

The determining 408 of the client supported cipher suites for receiving messages from the client and for selecting 410 a cipher suite for receiving messages on the client may be performed in the manner described above in 404-406.

As noted above, a planned use of a session may be matched to a cipher suite in various ways in accordance with various embodiments. In some examples, potential planned uses of cryptographically protected communication sessions are stored in a data store, such as a database, in association with suitable cipher suites. In embodiments where multiple cipher suites supported by the client matched the determined planned use, a ranking or other mechanism may be used to select from the multiple cipher suites. The cipher suites may be ranked in various ways in accordance with various embodiments. In some examples, a system performing the process 400 is programmed with the cipher suites ranked in accordance with preference. The preferences for cipher suites may vary in accordance with planned use of sessions. For example, a set of cipher suites may be ranked in accordance with cryptographic strength such that the ranking can be used to select the most secure cipher suite of a set of suitable cipher suites when it determines planned use of the session is one corresponding to data security and confidentiality being of high importance. As another example, a set of cipher suites may be ranked in accordance with statistics regarding processing resources used when communicating in accordance with the various cipher suites. In this manner, when computational efficiency is more important for a planned use of a session, such a ranking may be used to select a most efficient cipher suite for the session. Other rankings may also be used, and the way in which cipher suites are ranked may vary in accordance with different characteristics of the cipher suites that are matched to different uses for a session.

Having selected 406 and 410 a cipher suite from the set of client supported cipher suites for both receiving and sending messages, a system performing the process 400 may complete 412 the handshake process using the selected cipher suite. The way in which the handshake process is completed 412 may vary in accordance with various embodiments. For instance, a server performing the process 400 may transmit a ServerHello message to the client, where the ServerHello message indicates to the client to use the selected 406 and 410 cipher suites. Other operations may also be performed and such operations may depend upon the particular implementation of the handshake process. In some examples, completion 412 of the handshake process may include transmitting a server certificate, generating a random number and providing it to the client, calculation of a premaster secret, derivation of a set of cryptographic keys from the premaster secret (for the cryptographic algorithms of the cipher suite) and transmission or receipt of a change cipher spec (CCS) notification indicating that the entity is participating in the handshake process are to switch from a handshake protocol to a record protocol.

FIG. 5 shows a diagram for illustrating communications between a client 502 and a server 504. The client 502 may communicate with the server 504 for the purpose of accessing one or more resources accessible to the server 504. In the diagram 500, the client 502 begins by generating 506 a ClientHello message with a set of client-supported cipher suites for receiving messages and a set of client-supported cipher suites for sending messages. The ClientHello message may be a ClientHello message configured in accordance with protocols implemented below the application layer of the Open Systems Interconnect (OSI) model and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

Having generated 506, the ClientHello message with the set of client-supported cipher suites for receiving messages and the set of client-supported cipher suites for sending messages, the client 502 may transmit 508 the ClientHello message to the server 504 over a network, such as the internet or another network discussed below. The server 504 accordingly may receive 510 the ClientHello message. To process the ClientHello message, the server 504 may obtain 512 a set of server-supported cipher suites for sending messages to the client and a set of server-supported cipher suites for receiving messages from the client. A cipher suite for server-to-client communications and a cipher suite for client-to-server communications may be select 514. As noted, selection of a cipher suite may be performed in various ways in accordance with various embodiments. In some embodiments, the ClientHello message lists a set of cipher suites supported by the client 502. The server 504 may accordingly select a cipher suite that is mutually supported by the client 502 and the server 504. If multiple such cipher suites are mutually supported by the client 502 and the server 504, the server 504 may select a most preferred cipher suite from the multiple cipher suites. The preferences may be indicated in the ClientHello message or may be configured in the server 504. As noted above, preferences may be associated with different session use indicators such that the particular ranking of cipher suites used for selection of a most preferred cipher suite may depend on the specific session use indicator that was received from the client 502.

Having selected 514 a cipher suite for client-to-server communications and a cipher suite for server-to-client communications, the server 504 may generate 516 a ServerHello message. The ServerHello message may indicate to the client 502 which cipher suites the client 502 should use for sending messages to and receiving messages from the server over the cryptographically protected communications session. The server may then transmit 518 the generated 516 ServerHello message to the client 502. The client may, accordingly, receive 520 the ServerHello message. Once the client 502 receives 520 the ServerHello message, the client 502 and server 504 may complete 522 a handshake process (referred to also as a handshake). A handshake may be completed in various ways in accordance with various embodiments, and generally, the way by which the handshake is completed may depend upon the specific protocol being used by the client 502 and the server 504.

Having completed 522 the handshake, the client 502 may then encrypt and transmit 524 a message (e.g., a request as shown in FIG. 5) to the server 504 using the client-to-server cipher suite. The message may be for example, a hypertext transfer protocol (HTTP) get request, or another request such as a web service request, whose fulfillment involves access to a resource specified in the request. Generally the request may be any message formatted in accordance with a syntax supported by the server 504. The server 504 may then receive over the cryptographically protected communications session the request that the client 502 transmitted 524. The server 504 may receive and decrypt 526 the message (e.g., a request as shown in FIG. 5) and, if applicable, fulfill 528 the request. Fulfillment of the request may include, for example, accessing the resource in a manner corresponding to the request, e.g., accessing the resource from storage encrypting the resource using a key negotiated in the handshake process that was performed by the client 502 and the server 504, and transmitting a response that includes the resource to the client 502 which the client 502 may then decrypt and process. Other variations are also considered as being within the scope of the present disclosure. The server may also, independently or in connection with the request that the client transmitted 524, encrypt and transmit 530 a message or response to the client using the service-to-client cipher suite. The client may receive and decrypt 532 the message or response. Note that in some embodiments, the handshake process may be performed with a first computer system to establish a cryptographically protected communications session with a second computer system. For example, handshake process may be delegated to the first computer system (e.g., in cases where the second computer system may have limited computing resources).

Note that while FIG. 5 shows the client 502 encrypting information that the server 504 decrypts as noted above, some examples may utilize protocols for establishing cryptographically protected communications sessions and using such sessions in a manner that provides data integrity but not confidentiality. As a result, the client 502 may for instance, not encrypt a request that the client 502 generated, but may simply transmit the request in unencrypted form to the server 504 which as a result of the request not having been encrypted may not decrypt the request, but may process the request if the request is determined to be authentic (e.g., not modified in transit).

Figure 6:
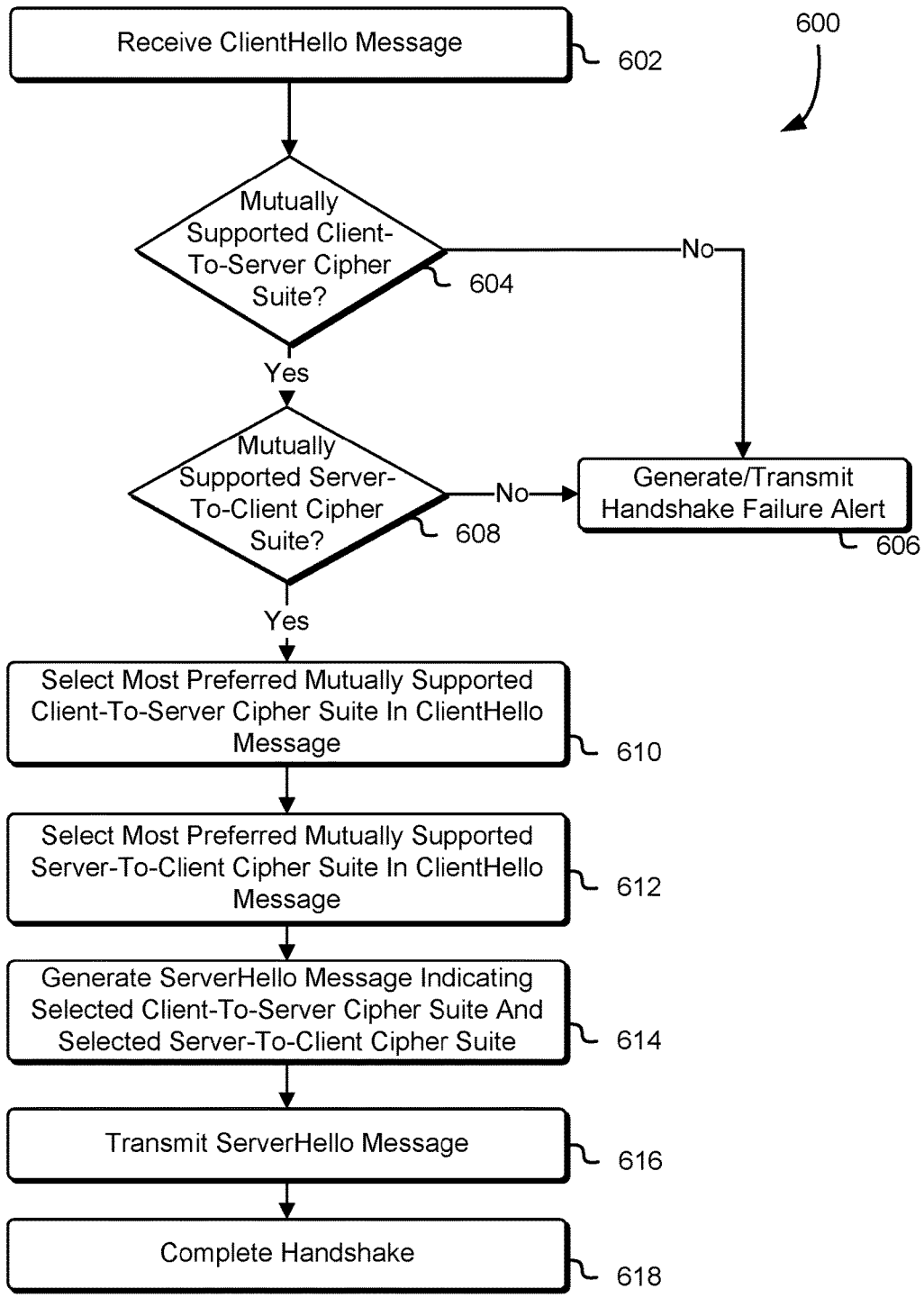
FIG. 6 shows a diagram illustrating a process for negotiating a handshake in accordance with an embodiment.

FIG. 6 shows an illustrative example of a process 600 that may be performed to perform a handshake in accordance with an embodiment. The process 600 may be performed by any suitable system such as a server computer system as noted above. Generally, the process 600 may be performed by any system that participates in a handshake process. In an embodiment the process 600 includes receiving 602 a ClientHello message. The ClientHello message may be received 602 over a network, such as the Internet. In response to having received 602 the ClientHello message, the process 600 may include determining 604 whether there is a mutually supported cipher suite for client-to-server communications. A mutually supported cipher suite may be a cipher suite that is supported by both the system performing the process 600, and a system that transmitted the ClientHello message that was received 602. Determining 604 whether there is a mutually supported client-to-server cipher suite may be performed for instance, by determining whether any cipher suites listed in the ClientHello message match a cipher suite that system performing the process 600 is configured to support.

If it is determined 604 that there are not mutually supported cipher suites, the process 600 may include generating and transmitting 606 a handshake failure alert. The handshake failure alert may be transmitted 606 to the system from which the ClientHello message was received 602. If it is determined however, that there is at least one mutually supported cipher suite, the process 600 may include determining 608 whether there is a mutually supported server-to-client cipher suite. The determining 608 of whether there is a mutually supported server-to-client cipher suite may be done in the same or similar manner to the determining 604 of whether there is a mutually supported client-to-server cipher suite. Additionally, these determinations 604 and 608 may in some embodiments, be done in parallel or may done in any suitable order such that it can be determined whether there is both a mutually supported client-to-server cipher suite and a mutually supported server-to-client cipher suite.

A system performing the process 600 may select 610 a most preferred client-to-server cipher suite listed in the ClientHello message that is mutually supported, that is, which is supported by the system that transmitted the ClientHello message that was received 602 and a system performing the process 600. The system performing the process 600 may select 612 a most preferred server-to-client cipher suite listed in the ClientHello message in a same or similar manner as just described. Additionally, the selecting 610 and 612 may be performed in any order such that both selections are performed before the transmission 616 of the ServerHello message.

As noted above, cipher suite preferences may vary in accordance with various embodiments. In some examples, a list of cipher suites in the ClientHello message is ordered in accordance with preference and such an ordering may be used to select 610 the most preferred mutually supported cipher suite listed in the ClientHello message. In other examples, a system performing the process 600 is configured with the configuration that specifies preferences for cipher suites supported by the system.

A system performing the process 600 may generate 614 a ServerHello message indicating the selected client-to-server cipher suite and the selected server-to-client cipher suite. The generated 614 ServerHello message may be transmitted 616 to a system from which the ClientHello message was received 602. Having transmitted 616 the ServerHello message system performing the process 600 may complete 618 the handshake. As noted above, a handshake may be completed in various ways in accordance with various embodiments and the manner in which the handshake is completed may depend on the particular protocol being used for the handshake. Once the handshake has completed, information may be transferred between systems involved in the handshake using any suitable record protocol.

Note that the various techniques described herein use, for the purpose of illustration, dynamic selection of a cipher suite based at least in part of a planned use for a cryptographically protected communications session, a cipher suite being an example parameter for cryptographic protection of communications. The techniques described herein may also be used to select other parameters for cryptographic protection of communications in addition to or instead of cipher suites and to cause cryptographically protected communications sessions to be established accordingly. For instance, in some examples, the techniques described above may be used to select which protocol is used as a parameter for cryptographic protection of communications. As another example parameter for cryptographic protection of communications, a mode of a protocol to be used (e.g., whether client authentication is used) may be selected in accordance with techniques described above. Note further that access control enforcement (e.g., as described in more detail below) may also be based at least in part on such parameters in addition to or instead of cipher suites. For instance, whether a request whose fulfillment involves access to data may depend on the protocol selected in addition to or instead of the cipher suite that is selected.

Figure 7:
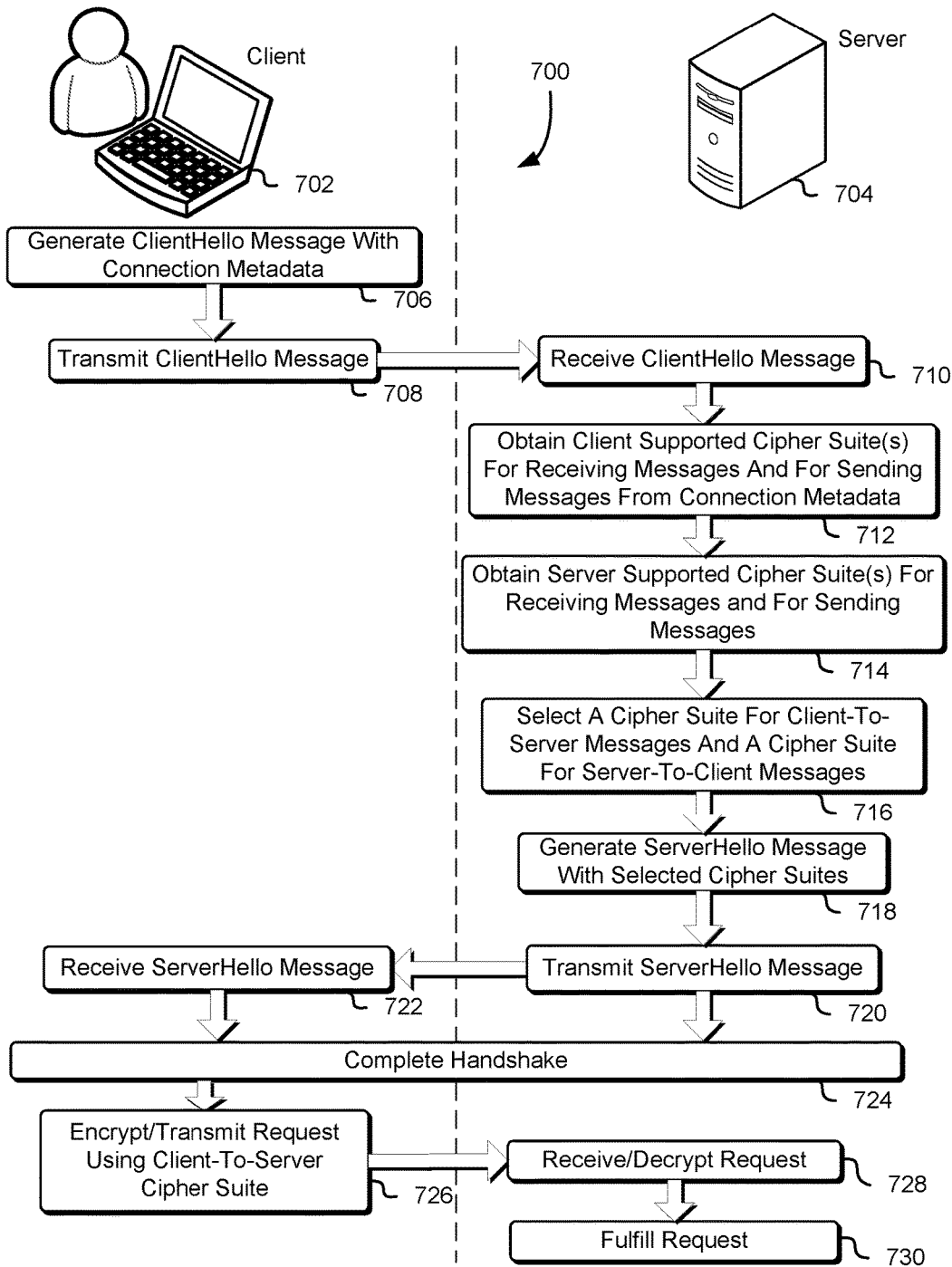
FIG. 7 shows a diagram illustrating communications between a client and a server in accordance with an embodiment.

FIG. 7 shows a diagram for illustrating communications between a client 702 and a server 704. The client 702 may communicate with the server 704 for the purpose of accessing one or more resources accessible to the server 704. In the diagram 700, the client 702 begins by generating 706 a ClientHello message with connection metadata useable by the server to obtain the client supported cipher suites. Connection metadata may include, for example, the connection latency value, geolocation context, hardware information such as the presence or identifier for the CPU and TPM chipsets present on the client device, and any combination thereof. More generalized connection metadata such as a hardware type (e.g., a DVR model number, stock keeping unit (SKU) for a particular type of product, or more generally, information that may be used to identify a product having certain attributes such as the presence of certain hardware, software, firmware, etc. that may be usable in the selection of cipher suites) or connection identifier (e.g., a wireless connection, a LAN connection, a broadband connection, a 500 Mbps/500 Mbps fiber connection). The ClientHello message may be a ClientHello message configured in accordance with protocols implemented below the application layer of the Open Systems Interconnect (OSI) model and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake. In some embodiments, the connection metadata may include a set of information that useable to obtain the client supported cipher suites—for example, a set may include a connection latency value, an upstream bandwidth, and a downstream bandwidth that may be useable to determine client supported cipher suites (e.g., cipher suites suitable for real-time streaming of high-definition media content).

In some embodiments, the client may also provide a set of client supported cipher suites that may be usable in conjunction with the connection metadata in selecting an appropriate cipher suite. In some embodiments, the set of client supported cipher suites may be obtainable based at least in part on the connection metadata.

In an embodiment, the client 702 may transmit 708 the ClientHello message in accordance with the manner described above in FIG. 5. In an embodiment, the server 704 may receive 710 the ClientHello message in accordance with the manner described in FIG. 5.

In an embodiment, upon receiving the ClientHello the server 704 may obtain 712 a set of client supported cipher suites based at least in part on the connection metadata provided in the ClientHello message. The obtaining 712 of a set of client supported cipher suites may be performed by any suitable system, such as the computing resource service provider described in FIG. 3. In other embodiments, the ClientHello may include a set of client supported cipher suites that can be extracted by the server.

In some embodiments, connection metadata may be used to exclude certain cipher suites from the set of client supported cipher suites. For example, connection metadata including information that the client is a mobile device may be used to exclude cipher suites that are not appropriate for a planned use. For example, a cipher suite with computationally expensive encryption and decryption operations may be excluded from the set of client supported cipher suites for mobile devices that have less processing power than desktop computer systems. However, in some embodiments, the connection metadata may be used to include certain cipher suites in the set of client supported cipher suites. For example, a ClientHello including connection metadata information verifying that the client supports a TPM chipset may be used to include additional cipher suites that would otherwise not be supported (e.g., due to performance and/or security constraints on a client that lacks a TPM chipset).

In some embodiments, the connection metadata may exclude some cipher suites and include others to the set of supported cipher suites. As an example, connection metadata denoting a geolocation context may be used to exclude certain cipher suites (e.g., the geolocation context denotes a country or government that restricts the import of cryptography technologies used in a cipher suite) as well as include certain cipher suites (e.g., a client within a geolocation context with insecure networks may wish to support stronger cipher suites).

As with other embodiments described in this disclosure, the set of client support cipher suites for sending messages and the set of client supported cipher suites for receiving messages may be ranked or ordered, and the sets may be different (i.e., include different cipher suites and/or include different rankings or orderings for the respective cipher suites). In some embodiments, one or more sets of client supported cipher suites may be obtained wherein a set of client supported cipher suites may be associated with a use context.

The server may obtain 714 the server supported cipher suites for receiving messages and for sending messages, for example, in accordance with the embodiment described in FIG. 5. Note that in some embodiments, the server may first obtain 714 the server supported cipher suites and then obtain 712 the client supported cipher suites. In some embodiments, both steps 712 and 714 may be performed in parallel (e.g., in a separate worker threads of a multithreaded computing environment).

The server may select 716 a cipher suite for client-to-server messages and a cipher suite for server-to-client messages. As with other embodiments described in this disclosure, these cipher suites may be the same cipher suite or may be different cipher suites.

In some embodiments, the respective ordering of the obtaining 712 and 714 of the client and server supported cipher suites and the selecting 716 of the cipher suites may vary in any manner suitable for the selection of a cipher suite. For example, in an embodiment, a method (e.g., in a worker thread) may obtain the set of client supported cipher suites for a use context (e.g., client-to-server communications), the set of server supported cipher suites for the same use, and the selection of the cipher suite, while a second method (e.g., in a second worker thread) may perform the same operations for a second use context (e.g., server-to-client communications). Variations on embodiments include but are not limited to using a sub-method (e.g., a child worker thread) that performs the obtaining 712 and 714 of the respective set of cipher suites for a use context.

The server may generate 718 a ServerHello message with the cipher suites selected 716 for the use contexts—in the embodiment described use contexts include server-to-client communication and client-to-server communications. The generating 718 of the ServerHello message may, for example, be performed in accordance with the embodiment described above in FIG. 5.

The server may transmit 720 the generated 718 ServerHello message to the client and the client 702 may receive 722 the ServerHello message transmitted 720 by the server 704 and the server and client may complete 724 the handshake process in any suitable manner. The transmitting 720 and receiving 722 of the ServerHello message and the competing 724 of the handshake may be accomplished, for example, in accordance with the embodiment described above in FIG. 5.

Upon completion of the handshake or as part of completion of the handshake, the client 702 may encrypt and transmit 726 a message (e.g., a request as shown in FIG. 7) using the selected client-to-server cipher suite, for example in accordance with the embodiment described above in FIG. 5. The server may then receive and decrypt 728 the message (e.g., a request as shown in FIG. 7) and if necessary, fulfill 730 the request. These steps may be performed, for example, in accordance with the embodiment described above in FIG. 5. In some embodiments, the client may, either after or as part of fulfilling 730 the response, encrypt and transmit the response to the client using the selected server-to-client cipher suite.

Figure 8:
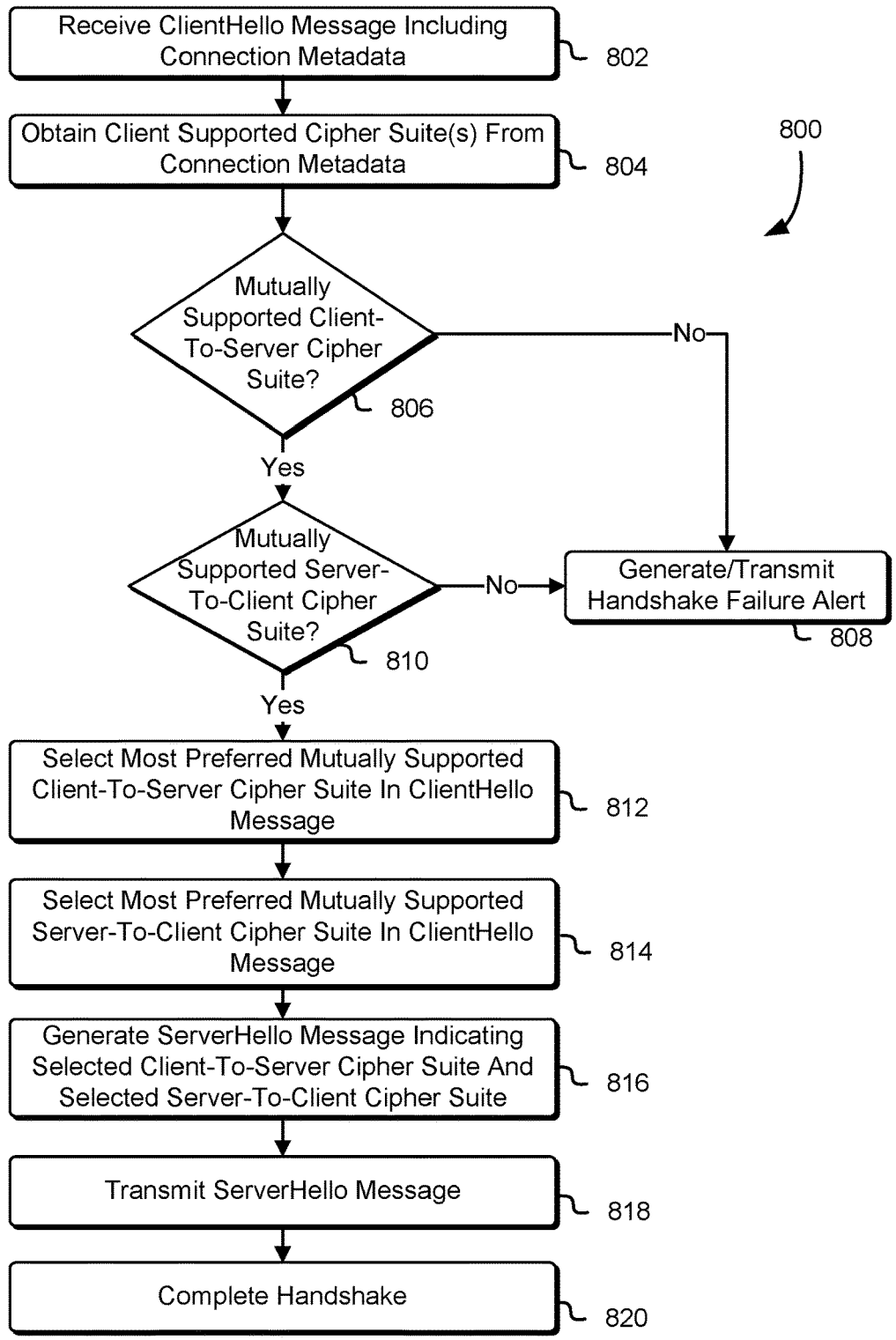
FIG. 8 shows a diagram illustrating a process for negotiating a handshake in accordance with an embodiment.

FIG. 8 shows an illustrative example of a process 800 that may be performed to perform a handshake in accordance with an embodiment. The process 800 may be performed by any suitable system such as a server computer system as noted above. Generally, the process 800 may be performed by any system that participates in a handshake process such as the server described in connection with FIG. 7. In an embodiment the process 800 includes receiving 802 a ClientHello message including connection metadata. The ClientHello message may be received 802 over a network, such as the Internet. In response to having received 802 the ClientHello message, the process 800 may include obtaining 804 a set of client supported cipher suites based at least in part on the connection metadata. In some embodiments, the obtaining 804 may include obtaining a first set of client supported cipher suites for client-to-server communications and obtaining a second set of client supported cipher suites for server-to-client communications. The obtaining 804 of a set of client supported cipher suites may, for example, be from obtaining a set of client supported cipher suites included in a ClientHello, or may be from obtaining connection metadata may be performed, for example, by the server of the embodiment described above in FIG. 7.

The determining 806 of a mutually supported client-to-server cipher suite and determining 810 of a mutually supported server-to-client cipher suite may be done, for example, in the manner described above in connection with FIG. 6. As in the process described in connection with FIG. 6, the failure to select both a mutually supported client-to-server cipher suite and a mutually supported server-to-client cipher suite may resulting the generating and transmitting 808 of a handshake failure alert.

The selecting 812 and 814 of the most preferred mutually supported cipher suite for client-to-server communications and server-to-client communications may be done in accordance with the process described above in FIG. 6. As in an process described in connection with FIG. 6, the selecting of the cipher suites may be done in any suitable manner, including selecting 814 the most preferred mutually supported server-to-client cipher suite before selecting 812 the most preferred mutually supported server-to-client cipher suite and selecting 812 and 814 the most preferred mutually supported cipher suites in parallel (e.g., in separate worker threads of a multithreaded computing environment).

The generating 816 of a ServerHello message and the transmitting 818 of the ServerHello message may be done in accordance with the process described above in FIG. 6. Completing 820 the handshake process may also be done in accordance with the process described above in FIG. 6.

Figure 9:
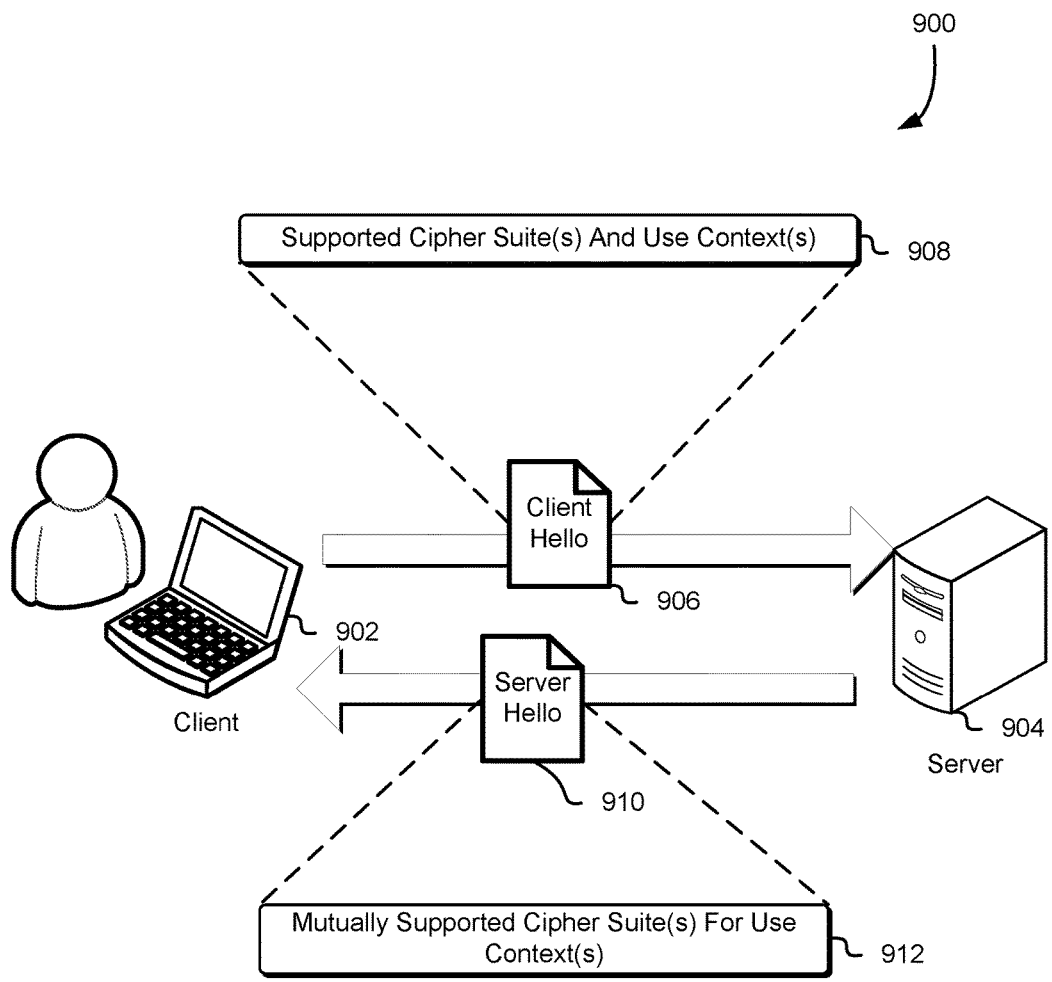
FIG. 9 shows an illustrative example of a client and server negotiating a handshake process.

FIG. 9 shows a diagram 900 illustrating a context in which various techniques of the present disclosure may be utilized. In this particular example, the diagram 900 shows a client 902 and a server 904 performing a handshake. The handshake may be initiated in response to a user input to the client 902 or may be automatic (e.g., setup as part of an HTML request). The client 902 may transmit a ClientHello message 906 to the server 904 to initiate a handshake process to establish a cryptographically protected communications channel over which resources may be transferred. Accordingly, the ClientHello message 906 may specify a set of cipher suites and use contexts supported by the client. Use contexts may, for example, include the direction of the traffic to be transmitted using the cipher suite—in an embodiment, the ClientHello message 906 may include a set of supported cipher suites for use in transmitting messages from the client to the server (i.e., a set of client supported cipher suites for client-to-server messages) and a set of supported cipher suites for use in receiving messages sent to the client from the server (i.e., a set of client supported cipher suites for server-to-client messages). In addition to or independent of the above example, use contexts may also be associated to the sensitivity or confidentiality of data to be transmitted using the cipher suite.

As an example, in an embodiment, a server (e.g., a server fulfilling a request to view an HTML website with the client's private customer information) may use a weaker cipher suite (e.g., a cipher suite that provides assurances of integrity and authenticity but not confidentiality) for transmitting non-sensitive data from the web site (e.g., publically available images, logos, or static web content) and a stronger cipher suite (e.g., a cipher suite that provides assurances of integrity, authenticity, and confidentiality) for transmitting the customer's private information (e.g., social security number, bank account information, protected PII, PHI, and more). For example, a weak cipher suite used for transmitting non-sensitive data from a website (e.g., publically available images, logos, or static web content) may use a null cipher suite as disclosed in RFC 2410 dated November 1998 which is hereby incorporated by reference. In such an example, the cipher suite provides assurances of integrity, but may not provide assurances of confidentiality.

As described above, in some embodiments, a set may include exactly one cipher suite. In many embodiments, the set of supported cipher suites for a first use context and the set of supported cipher suites for a second use context may be distinct, but in some embodiments, the sets may include the same cipher suites, that is, the same cipher suites are supported for both use contexts. In some embodiments, the sets may include the same cipher suites but in a different ordering or ranking.

In an embodiment, the server receives the ClientHello message 906, obtains the client's supported cipher suites and use contexts 908, and determines the server's set of supported cipher suites for the use contexts (not shown in FIG. 9). The server then selects a mutually supported cipher suite for a use context which may be used for the cryptographically protected communications session. If multiple cipher suites are mutually supported, various methods may be used to select one of the mutually supported cipher suites such as methods described in connection with FIG. 1.

In some embodiments, a mutually supported cipher suite for a use context may not exist, for example, where an older device does not support newer encryption capabilities required by a service. In such an embodiment, the server may send the client an indication that the handshake failed (e.g., an error message) or may attempt to re-negotiate the handshake with the client.

In some embodiments, one or more mutually supported client-to-server cipher suite for a use context 912 may be selected and provided to the client 902 as part of a ServerHello message 910. The client may use this information to complete the handshake, and upon completion, the server and client may communicate with each other over a cryptographically protected communications session using the selected cipher suites. In some embodiments, completing the handshake process may include sending a message to enable communication over the cryptographically protected communications session.

In some embodiments, a set of concurrently supported cipher suites may be mutually supported. Furthermore, the set of concurrently supported cipher suites may be indexed such that each cipher suite maps to a number—e.g., a set of N supported cipher suites may be indexed 0, 1, ... N−1. In an embodiment, a party of a cryptographically protected communications session may select an index, send message, TLS record, or other types of discrete data packets in accordance with the cipher suite corresponding to the index. In some embodiments, the indices are available to both the client and server as a result of the negotiation, but not other parties, and the client and server may select an index, send a record (e.g., TLS record) in accordance with the cipher suite corresponding to the selected index, wherein the record includes an indication of the selected index. The recipient of the record may then, using the indication of the selected index to process the record (e.g., decrypt the record using an encryption algorithm specified in the cipher suite corresponding to the selected index). In some embodiments, the selection of an index may be performed in a non-deterministic manner (e.g., selection using an unweighted random distribution, weighted random distribution, and so forth). In some embodiments the selection of an index may be performed in a deterministic manner (e.g., determining the security level of a request or part of a request and selecting an indexed cipher suite that is sufficient for the security level).

Figure 10:
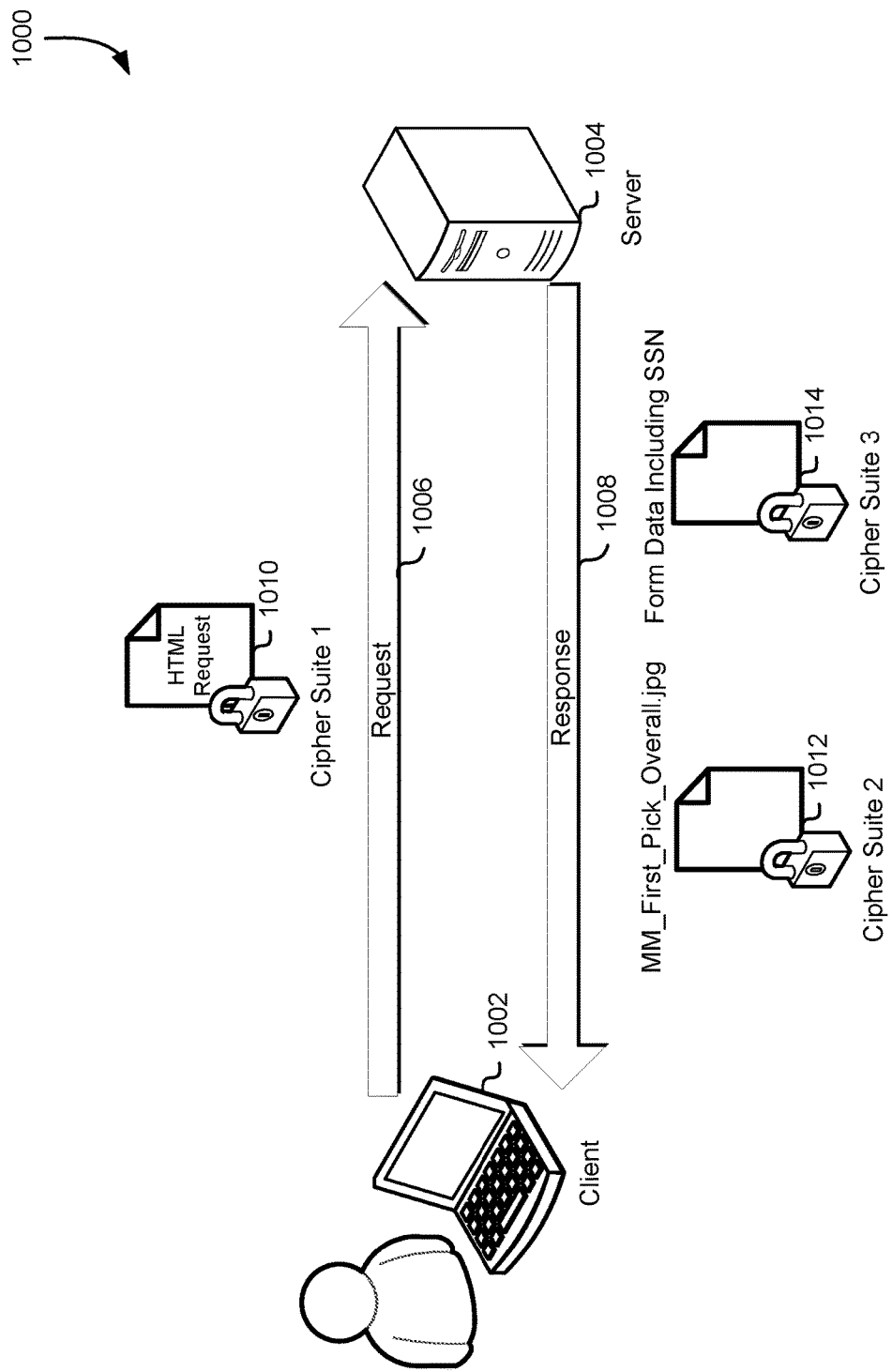
FIG. 10 shows an illustrative example of a request and response in accordance with an embodiment.

FIG. 10 shows a diagram 1000 illustrating a context in which various techniques of the present disclosure may be utilized. In this particular example, the diagram 1000 shows a client 1002 and a server 1004 which may be the client and server such as described above in connection with FIG. 9. In an embodiment, the client 1002 and server 1004 complete a handshake process, for example as described above in connection with FIG. 1. The client 1002 may send a request 1010 to the server over the cryptographically protected communications session using the client-to-server cipher suite 1006 negotiated by the client and server during the handshake. In response, the server 1004 transmits a hypertext markup language (HTML) document that includes a website image 1012 using cipher suite 2 and form data 1014 including private information (e.g., a social security number) using cipher suite 3 to the client 1002. For example, cipher suite 2, used for transmitting a website image, may use a null cipher suite as disclosed in RFC 2410 dated November 1998, while cipher suite 3, used for transmitting form data including private information, may use a more secure cipher suite such as an AES cipher suite disclosed in RFC 3268 dated June 2002 which is hereby incorporated by reference.

In some embodiments, the negotiated cipher suites used as part of the cryptographically protected communications session comprises substantially of messages in accordance with a version of TLS—that is, that a substantial proportion of the messages are sent using a particular cipher suite. In some embodiments, between approximately 60% and approximately 80% of the messages are in accordance with a version of TLS (e.g., TLS version 1.2 as defined in RFC 5246 dated August 2008 which is hereby incorporated by reference), which may allow system hardware to leverage existing acceleration hardware, and may allow for easier interoperability with existing software without major changes. In some embodiments, at least approximately 70% of the messages are in accordance with a version of TLS. Thus, the techniques of the present disclosure are applicable to future versions and updates of TLS and other protocols, perhaps yet undeveloped, that share a substantial number of characteristics with various TLS versions.

Either automatically or in response to user input, the client 1002 may transmit a ClientHello message to the server 1004 to initiate a handshake process to establish a cryptographically protected communications channel over which the resource identified by the request 1010 should be transferred. Accordingly, the ClientHello message may specify a set of supported cipher suites for use contexts, that is, a set of cipher suites supported by the client 1002, and an extension to the ClientHello message may specify the request 1010 thereby indicating to the server 1004 a planned use of a cryptographically protected communications session to be established between the client 1002 and the server 1004. The ClientHello message may, for instance, include the request in plaintext, provide an encrypted copy of the request (decryptable by the server, for instance, by being encrypted using a public cryptographic key of a public-private key pair associated with the server), provide an anonymized request that is generated based at least in part on the request, and/or other information specific to the request as described above in connection with FIG. 2.

The server 1004 may receive the ClientHello message and may complete a handshake process with the client 1002 such as in accordance with FIG. 7. The server 1004, assuming successful completion of the handshake process, may establish a cryptographically protected communications channel with the client 1002, and may transfer the HTML response to the client 1002 over a network for rendering by the client 1002 or other processing, which may be dependent on how the response 1008 is encoded—the response 1008 may use either of cipher suite 2 or cipher suite 3 depending on the data sent in the response.

In some embodiments, a set of mutually supported ciphers suites may be negotiated to facilitate communications between a client and server that includes the use of an intermediary proxy. As an example, a client may negotiate with a server to a first cipher suite to be used for data sent by the client to the server and a second cipher suite to be used to satisfy criteria set forth by the proxy for facilitating communication. In such an embodiment, the second cipher suite may be selected such that it is mutually supported by the client and proxy. As an example, a request may be encrypted and sent using the first cipher suite, and a certificate chain for the request may be encrypted and sent using the second cipher suite. A proxy configured to verify certificate chain may receive the encrypted request and the encrypted certificate chain, decrypt the encrypted certificate chain, verify that the certificate chain is valid, and only forward the encrypted message if the certificate chain is valid. In such a configuration, the proxy may avoid decrypting the encrypted message, which may be much larger in size than the encrypted certificate chain, while still verifying that the encrypted message's chain of trust is unbroken. In some embodiments, the proxy may not have the capability to decrypt the encrypted message, which was encrypted under the first cipher suite which may not be supported by the proxy.

Figure 11:
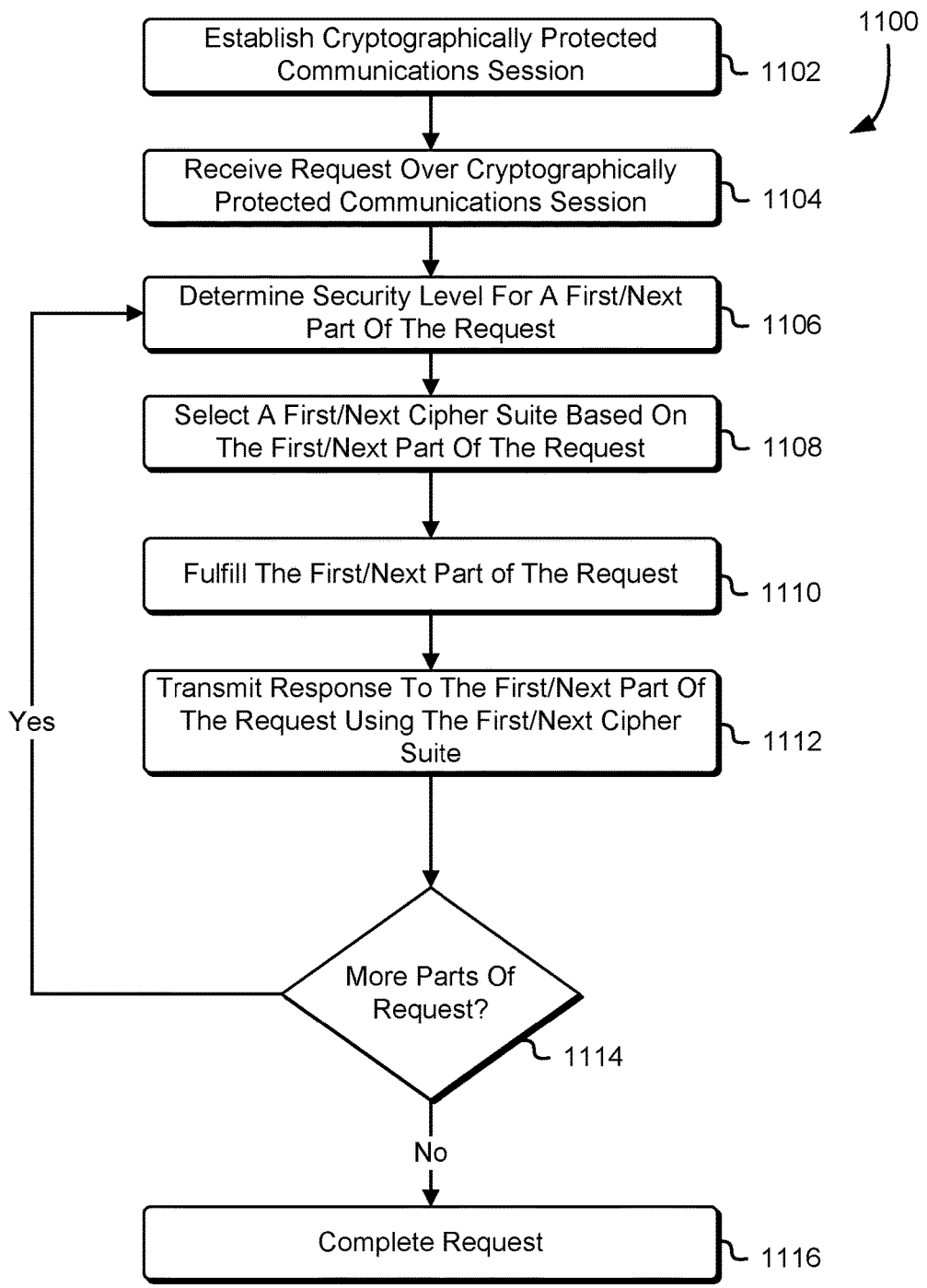
FIG. 11 shows a diagram illustrating communications between a client and a server in accordance with an embodiment.

FIG. 11 shows an illustrative example of a process 1100 that may be used to complete a request, for example, a HTML request to a server such as the server described above in connection with FIG. 10.

A cryptographically protected communications session may be established 1102 for example, using the handshake process described above in connection with FIG. 9 and FIG. 10. The cryptographically protected communication session may include one or more mutually selected cipher suites for use contexts. For example, in FIG. 10, cipher suite 1 may be used for a first use context (e.g., requests made by the client to the server), cipher suite 2 may be used for a second use context (e.g., responses to the client by the server, wherein the response data includes no confidential data), cipher suite 3 may be used for a third use context (e.g., responses to the client by the server, wherein the response data includes confidential data).

If a request over the cryptographically protected communications session is received 1104, the request may be fulfilled in parts. For example, the request may be parsed to determine 1106 the security level required for a first part of the request. In an example, the first part of the request may include a request for a publicly available image. A first cipher suite may be selected 1108 based on the first part of the request such that the cipher suite is suitable for use with the first part of the request. The first part of the request may be fulfilled 1110 by using the first cipher suite to transmit 1112 the response to the first part of the request over the cryptographically protected communication session. In some embodiments, the transmitting 1112 of the response may include a partial completion message that may be used by the recipient to determine that there may be more parts to the request. A partial completion message may include a part of a response to a request. A partial completion message corresponding to a first cipher suite with certain security characteristics may be used to send some content requested, while a second cipher suite with other security characteristics may be used to send other content that may require different security assurances. This may be used, for example, where a server receives an HTML request, and a first partial completion response using a cipher suite with strong encryption characteristics is used to ensure the security and integrity of sensitive information contained on the webpage (e.g., credit card information) while a second partial completion response using a second cipher suite with weaker security characteristics may be used to provide information that does not need strong security and/or integrity assurances (e.g., publicly available images or forms).

Determining whether there are more parts of the request 1114 may be done, for example, by parsing the request and/or response. In an embodiment, a server receiving an HTML request may obtain the HTML document corresponding to the request and parse the HTML document. Upon parsing of the HTML document may reveal that the document contains sensitive information (e.g., form data including a social security number) that should use a cipher suite with stronger cryptographic properties than the first cipher suite used above. The system may then determine 1106 the security level for the second part of the request (i.e., a part of the request that includes the form data including a social security number) and select 1108 a second cipher suite that has acceptable cryptographic properties for use with the form data. The second part of the request may be fulfilled 1110 and transmitted 1112 as part of a partial completion response to a client using the second cipher suite. In some embodiments, additional parts 1114 of the request may be detected such that several cipher suites may be used in connection with a request.

Upon determining that there are no more parts of the request, completion 1116 of the request may include transmitting a full completion message so that the recipient may determine that no more partial competitions will be transmitted. In some embodiments, no action may be taken as part of completing 1116 the request. For example, the client may have enough information from the partial requests to determine that a request has been completed, such as where the partial completion message includes information regarding the total number of parts in the request (e.g., the first partial completion message includes information that it is the first of N partial completions, the second partial completion messages includes information that it is the second of N partial completions, etc. In such a configuration, the recipient, upon receiving all N partial completions, may implicitly determine that the request has been fully completed).

Figure 12:
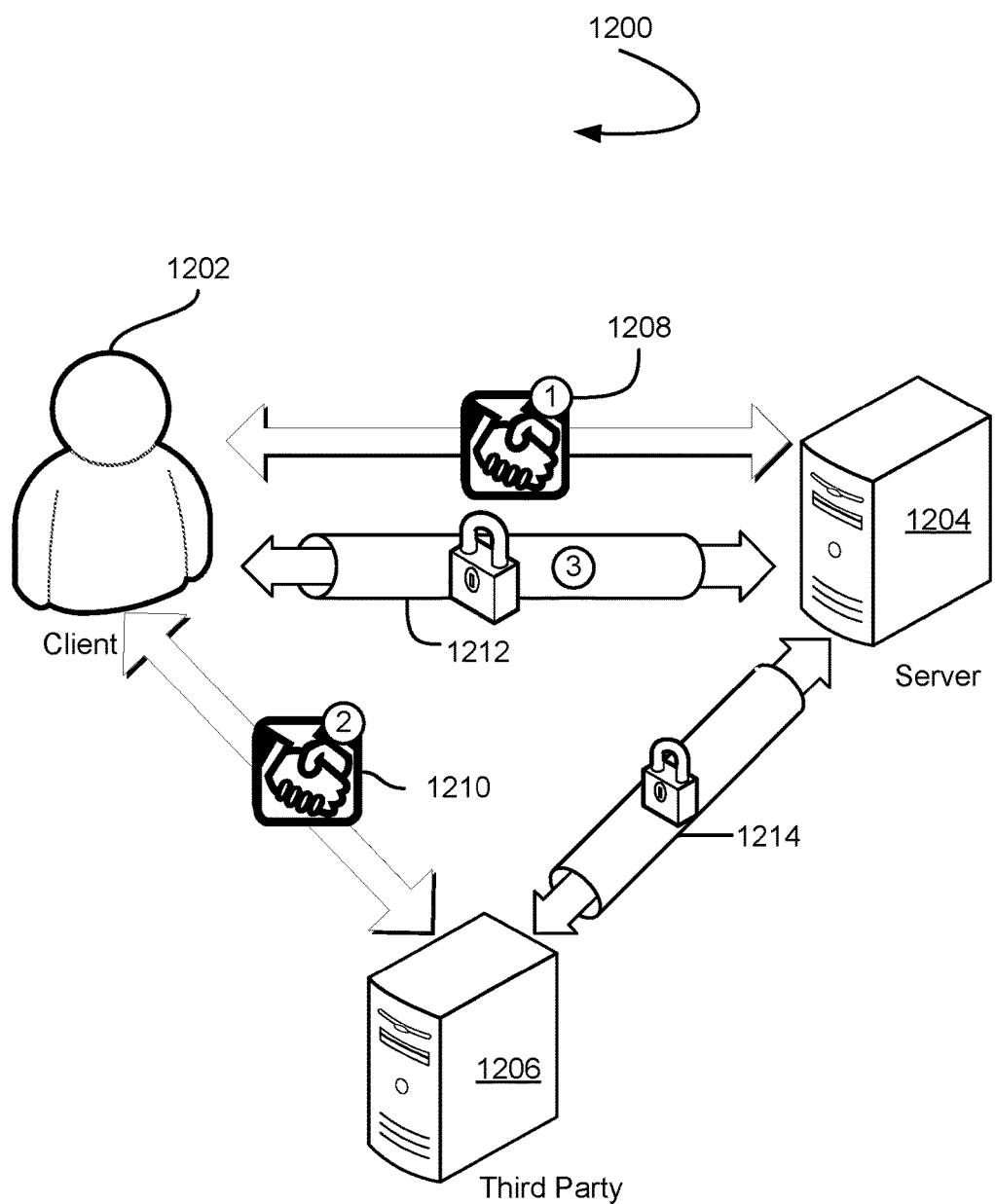
FIG. 12 shows an illustrative example of an environment in which various embodiments can be implemented.

FIG. 12 shows an illustrative example of an environment in which various embodiments can be implemented. In this example, the environment 1200 includes a client 1202, a server 1204 and a third party computer system 1206. In an embodiment, the client 1202 is a computer system such as a notebook or desktop computer, a tablet computing device, electronic book reader, mobile device, or other type of computing device including those enumerated below. The client 1202 may operate in accordance with a client application such as a browser, mobile application, or other set of executable instructions that cause the client 1202 to communicate with the server 1204 and the third party 1206 such as described in more detail below.

The server 1204 may be a server computer system and may include one or more server applications. Similarly, the third party 1206 may be a server computer system such as the server 1204. It should be noted that the third party 1206 may be a third party to the communications between the client 1202 and server 1204, and that the third party is not necessarily controlled, managed, hosted, or otherwise operated by an entity different than an entity that operates the client and/or an entity that operates the server 1204. Generally, some or all of the entities illustrated in FIG. 12 may be operated by, owned by, and/or hosted by the same party.

The client 1202, server 1204, and third party 1206 may communicate over a network such as the Internet. It should be noted that various types of communications in various types of networks, including those discussed below, may also be used. For example, in some embodiments, communications between a pair of entities shown in FIG. 12 occur over a public communications network such as the Internet, and communications between another pair of entities in the environment 1200 illustrated in FIG. 12 occur over another channel, such as a local area network or use a short-range communications protocol to establish a short-range communication channel. The short-range communication channel may be established using various technologies, such as induction wireless, infrared wireless (such as technologies operating according to specifications and protocols provided by the Infrared Data Association or IrDA), or ultra wideband formats. In some embodiments, the first and second devices may utilize short-range, low-power, and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure by using such mechanisms for inter-device communication are well known to those skilled in the art of computer communications and thus, need not be described in more detail herein. Generally, embodiments described herein are not limited to those explicitly illustrated herein.

Turning to aspects of the present disclosure illustrated in FIG. 12, in an embodiment the client 1202 performs a handshake process 1208 with the server 1204. In some embodiments the handshake process 1208 is in accordance with the TLS protocol such as defined in Request for Comments (RFC) 5246, RFC 2246, RFC 4279, and RFC 6176, which are incorporated herein by reference. Other protocols such as secure sockets layer (SSL) and other protocols implemented below the application layer of the Open Systems Interconnect (OSI) model may also be used and/or adapted to utilize techniques described herein. The handshake process 1208 may be used by the client 1202 and the server 1204 to negotiate a set of security parameters (referred to briefly as "security parameters) for establishment of a secure channel over which communications may be encrypted. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

Performance of the handshake process 1208 may enable the client 1202 to transmit encrypted communications that are decryptable by the server 1204 and similarly may enable the server 1204 to encrypt communications to the client 1202 that are decryptable by the client 1202. Once the handshake process 1208 has been completed, the client and server may communicate with one another securely (i.e., by each entity encrypting messages so as to be decryptable by the other entity but not decryptable to other entities). In an embodiment, one or more communications transmitted over a secure communications channel established using the handshake process 1208 include a notification from the server 1204 to the client 1202 to contact the third party 1206. A secure communications channel may have a mode of communication between two (or among more than two) computer systems where each entity is operable to encrypt messages such that another entity to which the encrypted messages are transmitted is operable to decrypt the messages. An example secure communications channel is a TLS session negotiated using a TLS handshake. While various examples of the present disclosure use pairs of devices communicating with one another for the purpose of illustration, secure communications channels may be established in groups of devices where the number of devices is greater than two. The techniques described herein may thusly be adapted by providing the entities the information that enables employment of techniques described herein.

As discussed in more detail below, the server 1204 may provide to the client 102 information that enables the client 1202 to contact the third party 1206. The information may include, for instance, an identifier of the third party 1206 such as a network address, which may be an Internet protocol (IP) address of the third party 1206 or a referral thereto. For example, in some embodiments the server 1204 sends to the client 1202 a uniform resource locator (URL) that can be used by the client 1202 to communicate with a domain name service (DNS) to obtain a network address of the third party 1206.

Once the client 1202 has been instructed or otherwise notified by the server 1204 to contact the third party 1206, the client 1202 may initiate a handshake process 1210 with the third party 1206. The handshake process 1210 may be performed using a handshake process in accordance with a handshake protocol of a secure communications protocol, such as TLS, or by using another protocol. Once the third party 1206 has completed the handshake process 1210 with the client 1202, the third party 1206 may communicate security parameters for a secure channel to be established between the client 1202 and the server 1204. The security parameters communicated by the third party 1206 to the client 1202 over a secure communication channel established using the handshake process 1210 may enable the client 1202 to communicate over a new secure channel 1212 with the server 1204. The security parameters provided by the third party 1206 to the client 1202, for example, may include one or more cryptographic keys usable by the client for the secure channel 1212. The security parameters may also include information from which the client 1202 may derive cryptographic keys for use in communicating over the secure channel 1212. Generally the security parameters provided by the third party 1206 to the client 1202 may include information that enables the client 1202 to communicate over the secure channel 1212 with the server 1204 without having to negotiate parameters of the secure channel with the server 1204. For instance, the security parameters may include cryptographic material (a set of cryptographic keys and/or information from which a set of cryptographic key may be derived) that enables the client to communicate with the server over a secure channel without having to perform a cryptographic key exchange with the server. A cryptographic key exchange may be a process by which information is securely shared between two entities to enable each entity to encrypt communications to be decryptable by the other entity without an encryption key being transmitted in plaintext form from one system to the other.

To enable the server 1204 to communicate with the client 1202 over the secure channel 1212 the server 1204 may receive the same or different security parameters from the third party 1206. Whether the security parameters are the same or different may depend on the specific cryptographic algorithms being used for communication over the secure channel 1212. For example, in some embodiments, both the client 1202 and server 1204 receive a symmetric cryptographic key for encrypting communications over the secure channel 1212 or information from which the symmetric cryptographic key can be derived using information shared by the client 1202 and the server 1204. The security parameters may be different, for example, when asymmetric cryptographic algorithms are used by the client 1202 and server 1204 for communication over the secure channel 1212. In some embodiments, for example, the third party 1206 provides to the client 1202 a certificate corresponding to a private key held as a secret by the server 1204 or provided to the server 1204 by the third party 1206. The certificate may be used by the client 1202 to obtain a public key that is usable to encrypt communications to the server 1204 or information to enable encryption over the channel, such as a symmetric cryptographic key provided by the third party 1206 or generated by the client 1202.

In some embodiments, the server 1204 maintains a secure connection 1214 with the third party 1206, such as a VPN connection. However, in other embodiments, the server 1204 may perform a handshake process with the third party 1206 for the purpose of establishing a secure channel over which the security parameters may be provided by the third party 1206 to the server 1204.

Numerous variations of the example embodiment shown in FIG. 12 are considered as being within the scope of the present disclosure. For example, while a client and server relationship is used for the purpose of illustration, the techniques discussed herein may be used generally to enable communications between computer systems, regardless of whether those computer systems are classified as clients or servers. As another example, communications between the client 1202 and the third party 1206 may occur in various ways which may or may not involve a handshake. For example, the client 1202 may have a physical communications connection to the third party 1206 and as a result a handshake process may not be required for the purposes of establishing a secure channel between the client 1202 and the third party 1206. As another example, as noted above, communications between the client 1202 and the third party 1206 may occur over short-range communication. Communications between the client 1202 and the third party 1206 may or may not be encrypted. As other examples of variations considered as being within the scope of the present disclosure, communications between the third party 1206 and server 1204 may vary in accordance with various embodiments, including in ways discussed above in connection with communications between the client 1202 and the third party 1206.

As yet another example, the client 1202 may select a third party and notify the server 1204 of the selection. In some examples, the client 1202 and server 1204 negotiate selection of the third party by the client or server selecting from the intersection of sets of third parties respectively authorized and/or available to the client and server, respectively. One entity may present a list of authorized and/or available third parties and the other entity may select from the present lest based at least in part on a list of third parties that the other entity authorizes and/or has available.

In addition to the above, other variations considered as being within the scope of the present disclosure include variations involving communication with the third party 1206 by either the client 1202 or the server 1204, or both. For example, in some embodiments, techniques described herein for establishing a secure communications channel between the client 1202 and server 1204 may also be used to establish a secure communications channel between the client and/or server and the third party. In other words, a secure communications channel may be established between a client/server and a third party by involving a third party to the pair of entities communicating. Generally, any establishment of a secure communications channel between two computing entities (e.g., client, server, and third party) may utilize a third party in accordance with embodiments described herein. As a result, between two computing entities, the establishment of a secure communications channel may involve multiple third parties depending on which secure communications channels are established using a third party to a pair of computing entities.

Figure 13:
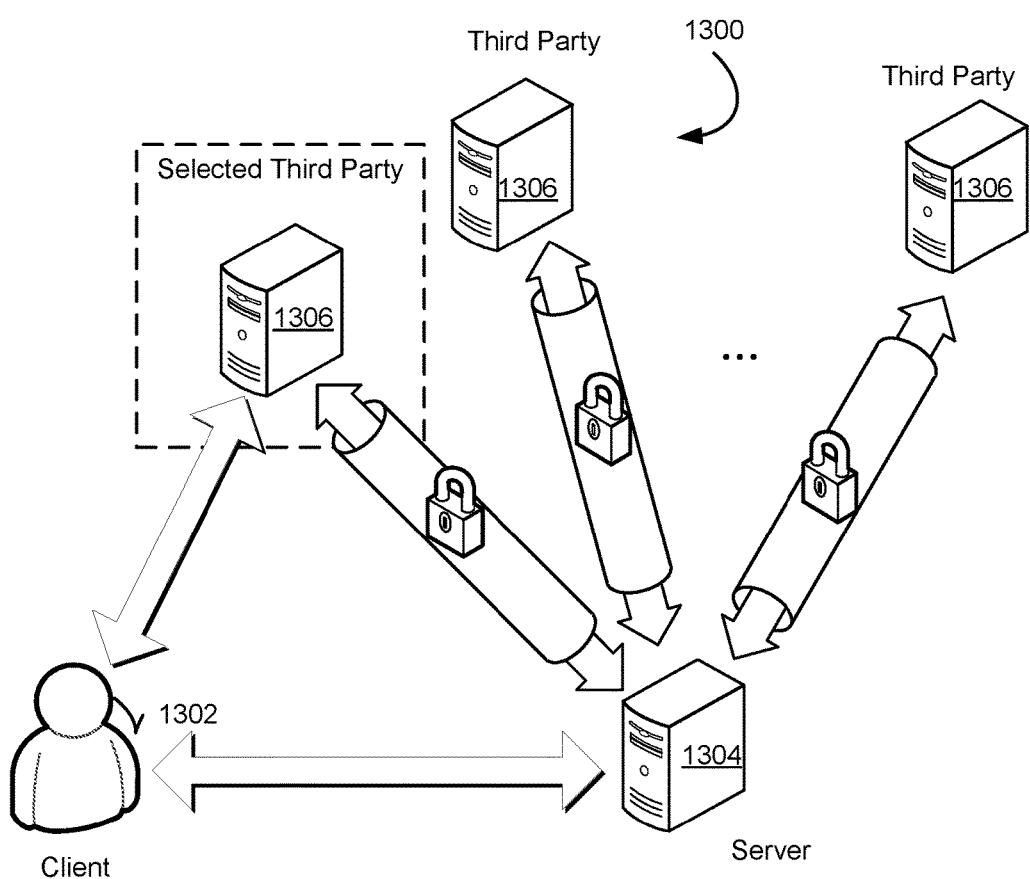
FIG. 13 shows an illustrative example of an environment in which various embodiments can be implemented.

FIG. 13 shows an illustrative example of an environment 1300 in which various embodiments can be implemented. In an embodiment, the environment 1300 includes a client 1302 and a server 1304. The client 1302 and the server 1304 may be client and server such as described above. As illustrated in FIG. 13, the environment 1300 includes a plurality of third parties 1306. Each third party 1306 may be a third party such as described above in connection with FIG. 12. The plurality of third parties may be servers that the server 1304 is able to communicate with. As illustrated in FIG. 13, in order to communicate with the client 1302 one of the third parties 1306 may be a selected third party which may be selected by the client 1302 or the server 1304.

The third party may be selected from the plurality of third parties 1306 in various ways in accordance with various embodiments. In some examples, the third party is selected by a random or other process, such as a round robin process. As noted above in other examples, the third party may be selected due to one or more characteristics of the third party. In some embodiments, the third party is selected based at least in part on a geographic location. As an example, the third party 1306 may be selected as a result of the client 1302 having an ability to communicate with the third party over a local area network and/or using short-range communications. In some embodiments, the client 1302 may have an associated registration of one or more devices capable of operating as a third party in accordance with the techniques described herein. As an illustrative example, the client 1302 may have an account with a service provider that operates the server 1304. The service provider may maintain a database that associates accounts with devices capable of operating as third parties. For instance, a device capable of operating as a third party may be a mobile device or tablet computing device having an application installed that enables the device to operate as a third party. When a need to utilize a third party is detected by the server 1304, the server 1304 may query the database to determine a device different from the client 1302 capable of operating as a third party. Other example devices that may be registered with an account include set top boxes, wearable computing devices, such as smart watches, and others. As yet another example, a third party may be an application running on the same device as the client 1302. Such a third party may, for example, be executed within a secure, hardware-protected execution environment, such as a trusted platform module (TPM), or in an enclave of a processor supporting Secure Guard Extension (SGX) functionality from Intel Corp.

A selection of a third party may also be made based at least in part by a state of a device capable of operating as a third party. For instance, various devices associated with a user, such as mobile devices and tablet computing devices, may have intermittent network connectivity and may often be in a powered-off state. The server 1304 (or client 1302) may determine which devices are capable of operating as a third party based at least in part on current states of those devices such as whether those devices are connected to a network and/or in a powered-on state. Determination of the state of the devices may be made, for example, by transmitting communications to those devices and identifying devices that respond as being capable of operating as third parties.

As another illustrative example, a device associated with an account and capable of operating as a third party may be a router or other piece of networking equipment registered with the account. As yet another example, a geographic location of the client 1302 may be used to select a device capable of operating as a third party. For instance, the client 1302 may be a mobile device such as a mobile phone or a tablet computing device with a global positioning system (GPS) or other mechanism from which a location of the client 1302 may be determined. As part of communicating with the server 1304, the client 1302 may transmit information indicative of the client's location. The server 1304 may select a device capable of operating as a third party based at least in part on the location provided by the client 1302. If, for example, the location of the client 1302 is determined as being within a particular business, such as a coffee shop, the server 1304 may cause a router or other device in the coffee shop to be selected as a third party. In some examples a device selected as capable of operating as a third party may be a beacon device that transmits information to the client 1302 using a sound-based or other protocol. In various embodiments where the device capable of operating as a third party is selected as a device accessible to a user of the client 1302, a user interface may indicate to the user to perform one or more operations on the selected device to enable security parameters to be provided to the client 1302, either by input from the user or in an automated fashion. However, in some embodiments the transfer of information from the selected third party to the client 1302 may be completely automated.

As illustrated in FIG. 13, the server 1304 may maintain persistent secure connections (e.g., VPN connections) with a plurality of third parties 1306 for the purpose of obtaining information from the third parties 1306 without the need of synchronously negotiating secure channels. The server 1304 may use different third parties for different clients and may use the same third party to obtain security parameters for multiple different customers, each with a corresponding set of security parameters.

Figure 14:
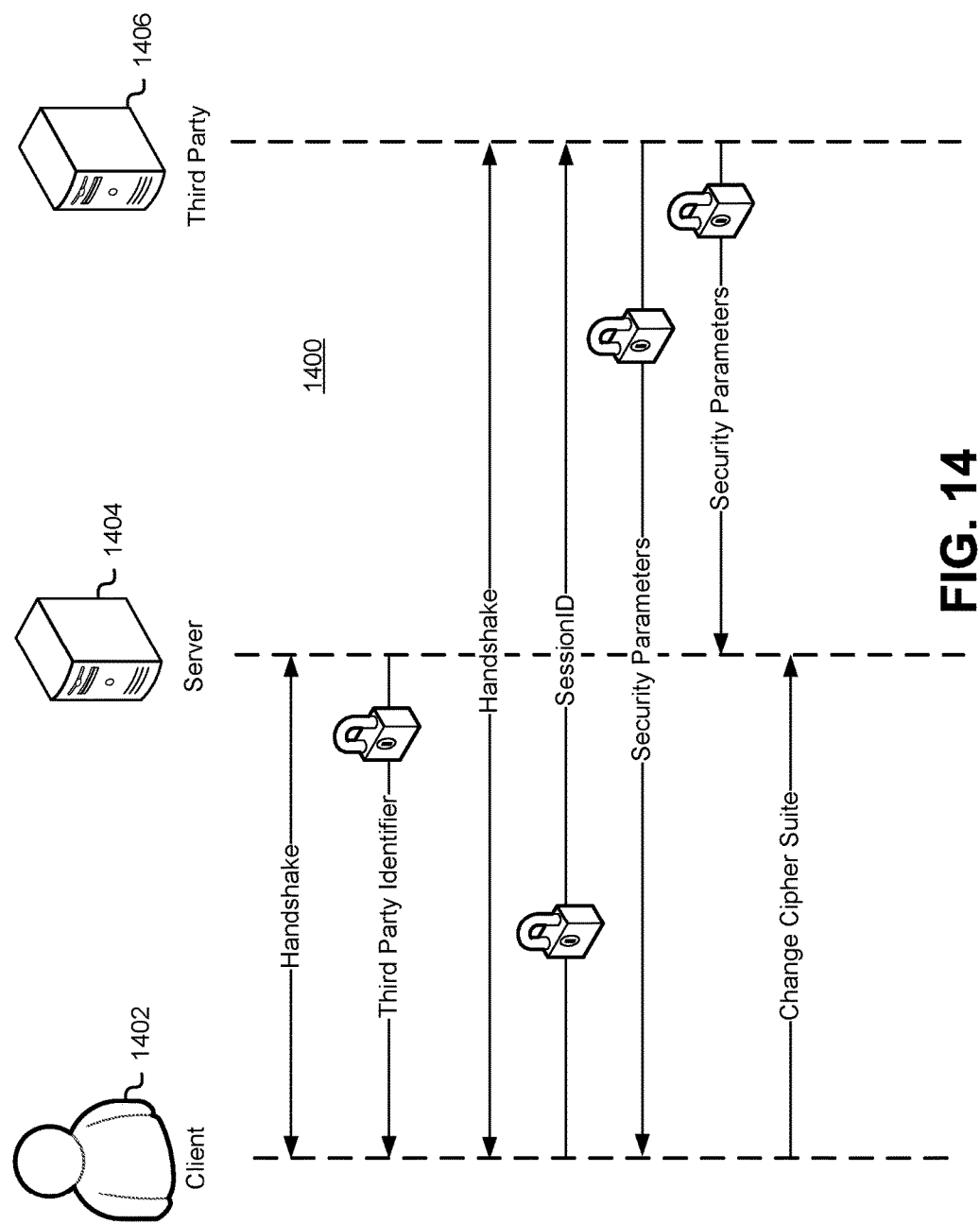
FIG. 14 shows a diagram illustrating a flow of communications in accordance with an embodiment.

FIG. 14 shows a diagram 1400 illustrating a flow of information in accordance with various embodiments. As illustrated in FIG. 14 the diagram 1400 represents communications among a client 1402, a server 1404, and a third party 1406, which may be a client, server, and third party such as described above. In an embodiment, the client 1402 completes a handshake process with the server 1404 to establish a secure communications channel with the server 1404. In some embodiments the client initiates the handshake process, such as by using a client hello message of the TLS protocol or by otherwise initiating a handshake of another protocol that utilizes handshakes. In the embodiment illustrated in FIG. 14, once a secure channel has been established, the server 1404 selects a third party and transmits an identifier of the third party over the secure channel to the client 1402. The third party identifier may be any information from which the client 1402 is able to communicate with the third party 1406. As noted, the third party identifier may be a URL, IP address, or other information that indicates to the client 1402 how to contact the third party 1406. In some examples, the third party identifier is an identifier that can be used as a reference to a pre-shared (as a secret) set of information about third parties. Credentials, a digital signature, or other information usable by the client 1402 to present to the third party 1406 to indicate authorization by the server 1404 may also be provided with the third party identifier.

Once the client 1402 has received the third party identifier from the server 1404, the client 1402 may perform a handshake process with the third party 1406. Once the handshake process between the client 1402 and the third party 1406 has completed, the client 1402 may transmit a session ID over a secure channel to the third party 1406. The session ID may correspond to the secure channel that was established between the client 1402 and the server 1404, and in this example the session ID enables the third party 1406 to distinguish security parameters for different client-server pairs that the third party 1406 may be serving. Other information that is usable by the third party to distinguish security parameters for different client-server pairs may also be used. The session ID may be provided from the client 1402 to the third party 1406 in various ways in accordance with various embodiments. In some examples, a message formatted in accordance with a protocol used by the client 1402 and the third parties 1406 to communicate may identify the session ID in a field of the message. As another example, the client 1402 may make an application programming interface request, such as a web services request, to the third party 1406 where a parameter of the request may specify the session ID. Such a request or other message transmitted for the purpose of providing the session ID to the third party 1406 may be authenticated using any manner rendering such messages cryptographically verifiable by the third party 1406.

When the third party 1406 has received the session ID, the third party 1406 may determine security parameters and transmit those determined security parameters over a secure channel to the client 1402. Third party 1406 may determine the security parameters in various ways in accordance with various embodiments. For example, in some embodiments, the client 1402, in addition to the session ID, transmits a list of cipher suites that the client 1402 supports and the third party 1406 may determine security parameters for the set of cipher suites. In another example, the client 1402, in addition to the session ID, transmits to the third party 1406 a set of cipher suites that the client 1402 and the server 1404 mutually support, which may be determined as the intersection of sets of cipher suites supported by the client 1402 and the server 1404 respectively. The client 1402 may determine the intersection of these sets using a set of cipher suites received from the server 1404 during the handshake process performed between the client 1402 and the server 1404. The set of cipher suites may be sent to the third party 1406 to enable the third party 1406 to determine a cipher suite to use and to determine parameters for that cipher suite, which may include a set of cryptographic keys to be used for communications using a secure channel in accordance with the selected cipher suite. The cipher suites transmitted to the third party 1406 may be ranked either by the client 1402 or by the third party 1406 in accordance with cryptographic strength or other parameters such as computational efficiency. In other examples, the security parameters for the secure channel between the client 1402 and third party 1406 may be the security that is determined. In such examples and in general, the client may present cipher suites (or the third party may already have stored cipher suites) supported by the server 1404. For example, the client may present to the third party the intersection of sets of cipher suites supported by both the client and the server so that the third party will determine security parameters for a cipher suite that is supported by both the client and the server.

As illustrated in FIG. 14, the third party 1406 may also transmit security parameters to the server 1404 which enable the client 1402 and the server 1404 to use their respective received security parameters to communicate with one another. In some examples, the server 1404, when receiving a communication from the client 1402, sends a request to the third party 1406 for the security parameters where the request may specify the session ID that was provided to the third party 1406 by the client 1402. As another example, a distributed computer system may be configured such that third party 1406 transmits the security parameters to the server 1404 using a push notification. When the client has received the security parameters from the third party 1406, the client 1402 may transmit a change cipher suite message to the server 1404 to indicate to the server 1404 to communicate in accordance with the security parameters received from the third party 1406. The change cipher suite message may be in accordance with the TLS protocol or may be a message formatted in accordance with an extension to the TLS protocol, or may be a message formulated in accordance with another protocol. Upon receipt of the change cipher suite message from the client 1402 to the server 1404, communications between the client 1402 and the server 1404 may be encrypted in accordance with the security parameters.

Numerous variations of the flow of information described in connection of FIG. 14 are considered as being within the scope of the present disclosure. For example, in some embodiments, the client 1402 indicates to the server 1404 the identity of the third party 1406. The client 1402 may, for example, indicate a device having short-range connectivity to the client 1402 and/or otherwise may select a third party using one or more factors such as described above. As another example, the third party may not communicate with the server 1404. The client 1402 may encrypt the security parameters to a public key associated with the server 1404 to enable the server 1404 to decrypt the security parameters using a corresponding private key. As another example, operations illustrated as being performed by the client 1402 may be performed by the server 1404 and, similarly, operations illustrated as being performed by the server 1404 may be performed by the client 1402. In yet other examples, one of the client or server may contact the third party prior to establishing a first communications channel with the other of the client and server, thereby causing the client or server and the third party to determine security parameters before the other of the client and server contacts the third party to determine the security parameters.

Figure 15:
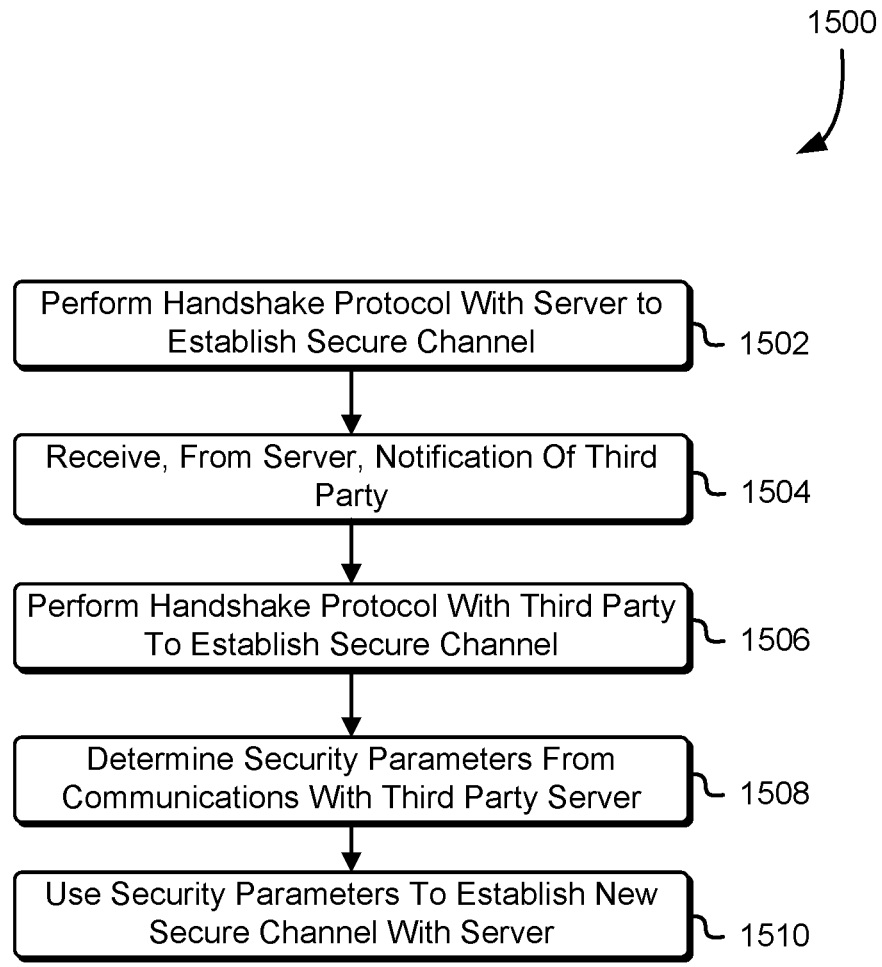
FIG. 15 shows an illustrative example of a process for establishing a secure channel in accordance with an embodiment.

FIG. 15 shows an illustrative example of a process 1500 which may be used to implement various aspects of the present disclosure. The process 1500 may be performed by any suitable computer system such as a client computer system as described above. In an embodiment, the process 1500 includes performing 1502 a handshake protocol (i.e., performing a handshake process in accordance with a handshake protocol) with a server to establish a secure channel. The handshake protocol may be, for example, a TLS or other handshake. After the secure channel has been established, the next communication or after having communicated over the secure channel for an amount of time, the process 1500 may include receiving 1504 from the server a notification of a third party. The notification may include information that enables the system performing the process 1500 to communicate with the third party to obtain security parameters for another secure channel to be established with the server. For example, the notification of the third party may include a network address or a reference to a network address, such as a URL.

Once the notification of the third party has been received 1504 and a system performing the process 1500 is thereby able to communicate with the third party, the process 1500 may include performing 1506 a handshake protocol with the third party to establish a secure channel with the third party. The handshake protocol performed 1506 with the third party may be the same handshake protocol performed 1502 with the server or it may be a different protocol such as when the third party is a device associated with the system performing the process 1500 that communicates with the system performing the process 1500 using a different communications protocol.

Once the secure channel has been established 1506, the process 1500 may include determining 1508 security parameters from communications with the third party server over the secure channel. The security parameters may be determined 1508 in various ways in accordance with various embodiments. For example, in some embodiments the security parameters are the parameters negotiated with the third party as a result of performance 1506 of the handshake protocol with the third party. As another example, the third party may transmit one or more messages that specify the security parameters. As noted above, the security parameters may indicate a cipher suite and a set of cryptographic keys or information usable to derive a set of cryptographic keys for communications over a secure channel in accordance with the security parameters.

Once the security parameters have been determined 1508, the process 1500 may include using 1510 the security parameters to establish a new secure channel with the server. In some examples, using 1510 the security parameters to establish a new secure channel with the server includes transmitting a message over the first secure channel that was established 1502 where the message indicates to the server to switch to a cipher suite using the security parameters. The message may, for example, be a message configured to cause resumption of a session, such as a ClientHello message of TLS with a session identifier. The session identifier may be the same as used in the first secure communications channel that was established or a session identifier that is part of the security parameters (and, therefore, that the server also has obtained). In some embodiments a system performing the process 1500 provides the server the security parameters in encrypted form, such as by encrypting the security parameters to a public key associated with the server, where the server has access to the corresponding private key. In other examples, as noted above, the server may obtain security parameters from the third party itself. Generally, once both the client and server have security parameters for communication over the new secure channel, the client and server may immediately begin communicating over the secure channel by encrypting messages in accordance with the security parameters and transmitting the encrypted messages.

Numerous variations of the process 1500 are considered as being within the scope of the present disclosure, including variations discussed above. For example, in some embodiments a client does not establish a secure channel with the third party. For example, the client may be directly, i.e., physically, connected to the third party and/or the client may otherwise communicate with the third party in a manner such that messages between the client and the third party are unlikely to be compromised. As another example of a variation of the process 1500 as considered as being within the scope of the present disclosure, as noted, roles of client and server may be reversed, including in connection with variations discussed above. Other variations are considered as being within the scope of the present disclosure.

Figure 16:
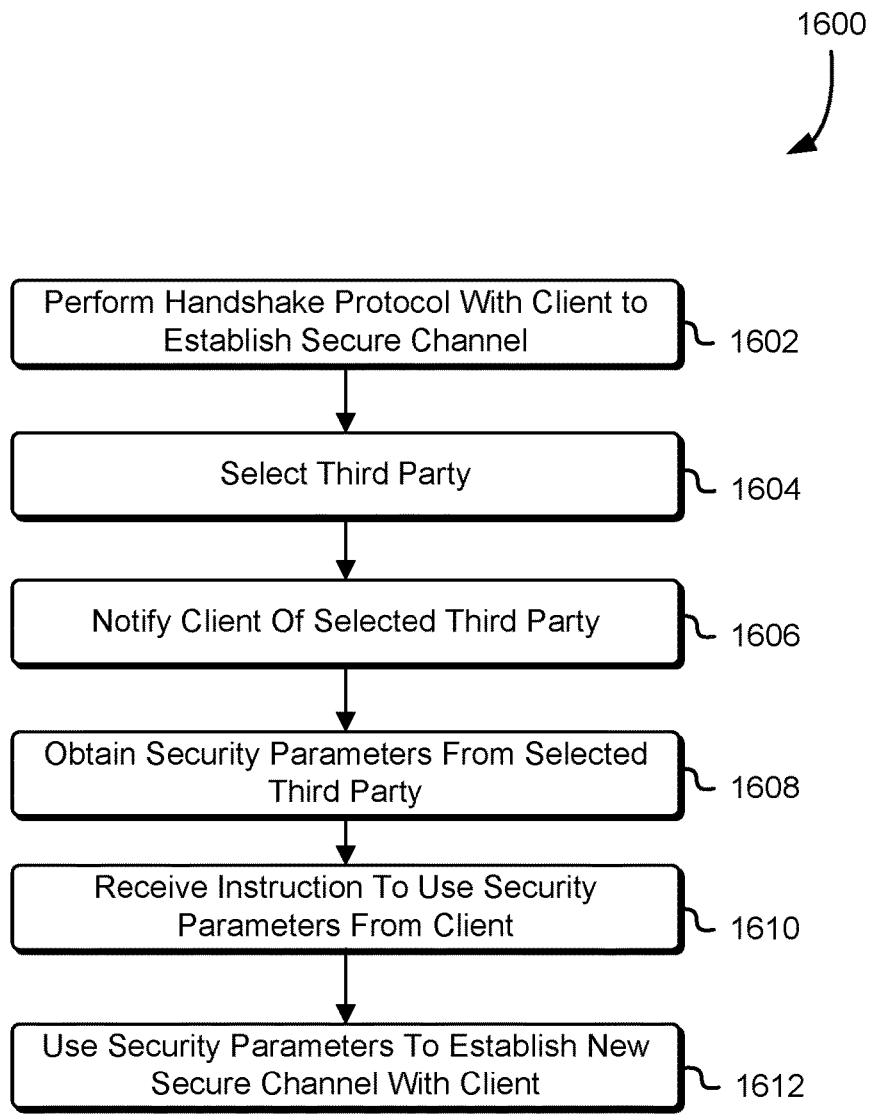
FIG. 16 shows an illustrative example of a process for establishing a secure communications channel in accordance with an embodiment.

FIG. 16 shows an illustrative example of a process 1600 for establishing a secure channel in accordance with an embodiment. The process 1600 may be performed by any suitable system such as by a server, as described above, although as discussed above operations described as being performed by a server may be performed by a client in some embodiments. In an embodiment, the process 1600 includes performing 1602 a handshake protocol with a client to establish a secure channel with the client. The handshake protocol performed 1602 may be, for example, a TLS handshake or other handshake of another protocol, generally, any protocol by which parameters for establishment of a secure channel may be used.

The process 1600 may also include selection 1604 of a third party which may be from a plurality of third parties capable of acting as a third party (e.g., by being online and having an application that, when executed, causes the third party to perform operations as described herein) in accordance with the techniques described herein. As noted above, the third party may be selected in various ways in accordance with various embodiments. In some embodiments, the third party is selected as having been pre-selected by the client. In other words, the client may indicate a third party to use where the indication from the client may be received over the secure channel that was established. In another example, the client transmits a list of potential third parties and the process 1600 includes selecting from the list provided by the client. In such examples, the list may be compared with a list of third parties with which the system performing the process 1600 is able to communicate and the third party may be selected from the intersection of the two lists. Other ways of selecting 1604, the third party may also be used; for example, as discussed above, geographic location of the client and/or the system performing the process 1600 and/or the third party may be used to make the selection. Generally, any way by which a third party may be selected may be used in accordance with various embodiments.

It should be noted that while FIG. 16 shows selection of a third party to occur after establishment of the secure channel with the client in various embodiments, the third party may be selected at other times. For example, a third party may be selected during the handshake protocol that is performed with the client. As another example, the third party may be selected prior to the handshake protocol having been initiated. In some examples, a system performing the process 1600 determines a next third party to use prior to the handshake with the client having been initiated.

Once the secure channel has been established 1602 and the third party has been selected 1604, the process may include notifying 1606 the client of the selected third party. The notification 1606 of the selected third party to the client may be communicated to the client over the secure channel that was established 1602. The notification 1606 to the client of the selected third party may be made in various ways in accordance with various embodiments. As noted, the notification may include a URL network address or other information identifying the selected server to the third party such as an identifier of the third party of which the client has accessible information such as a network address that enables the client to use the identifier to select the third party and use the network address to communicate with the third party.

The process 1600 may also include obtaining security parameters from the selected third party. The selected third party may, for example, transmit the security parameters over a secure channel to the system performing the process 1600. Once the security parameters have been obtained, the process 1600 may include receiving 1610 instructions from the client to use the security parameters. The received instruction may, for example, be in the form of a message transmitted over the secure channel.

Upon receipt of the instruction from the client, the security parameters may be used to establish a new secure channel with the client and to communicate over the secure channel. The secure channel may be established simply by receipt of the instruction or by acknowledgement to the client of the instruction in a message transmitted to the client. In addition to variations discussed above, variations of the process 1600 are considered as being within the scope of the present disclosure. For example, FIG. 16 illustrates obtaining 1608 security parameters from the selected third party. As noted above, however, the security parameters may be obtained in different ways such as from the client. As another example, instead of receiving an instruction to use the security parameters from the client, the process 1600 may include transmitting 1612 an instruction to the client to switch to a channel using the security parameters.

Figure 17:
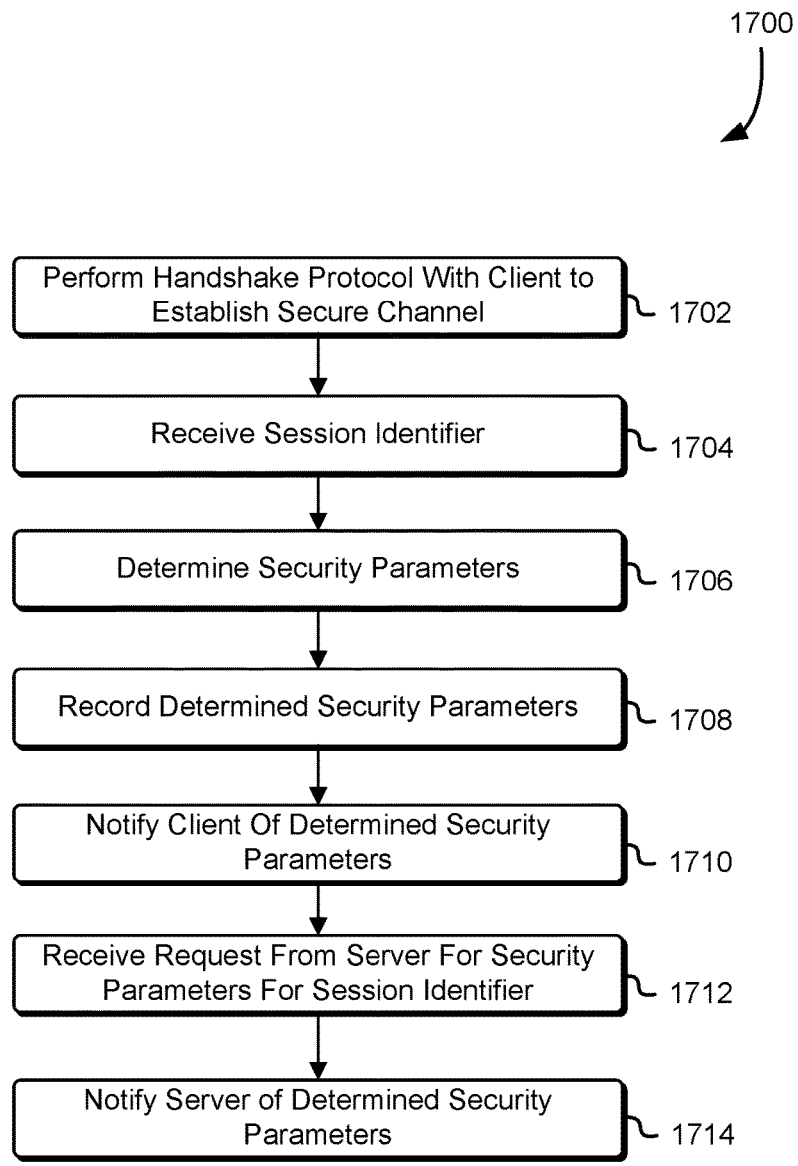
FIG. 17 shows an illustrative example of a process for providing security parameters for a secure channel in accordance with an embodiment.

FIG. 17 shows an illustrative example of a process 1700 for providing security parameters in accordance with an embodiment. The process 1700 may be performed by any suitable system such as by a third party discussed above. In an embodiment, the process 1700 includes performing a handshake protocol with a client to establish a secure channel with the client. The handshake protocol that is performed 1702 may be, for example, a TLS handshake or another handshake of another protocol.

Once a secure channel has been established 1702 with the client, the process 1700 may include receiving 1704 a session identifier from the client. The session identifier received 1704 from the client may indicate a secure channel established between the client and another computer system such as a server described above. The process 1700 may also include determining 1706 security parameters such as described above. The security parameters may include information about a cipher suite for a secure channel and cryptographic material for the secure channel where the cryptographic material may be a set of cryptographic keys and/or information usable to derive a set of cryptographic keys for the secure channel.

Once the security parameters have been determined 1706, the process 1700 may include recording 1708 that determine security parameters. The determined security parameters may be recorded in various ways in accordance with various embodiments such as by storing the determined security parameters in a database in association with the session identifier that was received 1704. The security parameters may be recorded in association with the session identifier in other ways such as in a cache accessible to a system performing the process 1700 where the cache may expire items in the cache based on a length of time in the cache to enable the security parameters to expire and become unavailable after an amount of time, thereby preventing attacks where an attacker breaks a secure channel over which the client communicates and, as a result, attempts to obtain the security parameters from the system to perform the process 1700.

Once the security parameters have been recorded 1708, the client may be notified 1710 of the determined 1730 parameters. As noted, the client may be notified 1710 of the security parameters in various ways in accordance with various embodiments. For example, the determined security parameters may be transmitted to the client in one or more messages that are encrypted in accordance with the secure channel that was established 1702 with the client.

The process 1700 may also include receiving 1712 a request from the server for security parameters for the session identifier that was received 1704. The request may be, for example, a web service request from the server to the system performing the process 1700 which may implement a web service application programming interface (API).

Upon receiving 1712 the request from the server for the security parameters for the session identifier, a system performing the process 1700 may use the session identifier to look up the security parameters such as by querying a database or obtaining the session parameters from a cache and may notify 1714 the server of the determined security parameters.

As with all processes described herein, numerous variations are considered as being within the scope of the present disclosure. For example, unless otherwise clear from context operations indicated as being performed in a particular order in the figures may, in some embodiments, be performed in a different order. As an illustrative example, security parameters may be determined 1706 prior to having received the session identifier.

As another example, in a variation of the process 1700, the client is not notified 1710 of the determined security parameters because the client uses the security parameters that were determined during the handshake protocol that was performed 1702 to establish the secure channel. As yet another example considered as being within the scope of the present disclosure, in some embodiments, a server does not transmit requests for the security parameters, but a system performing such a variation of the process 1700 may send a push notification to the server. To enable such an embodiment, a communication from the client that includes a session identifier may also include an identifier such as a network address or other identifier of the server with which the client is to use the security parameters to establish a new secure channel.

As noted above, security parameters provided to the client may differ from those provided to the server such as when using a cipher suite by which client and server use different cryptographic material for the transmission of messages. As one example, a client and server may each have an encryption key and a decryption key where the client's encryption key differs from the server's encryption key and, the client's decryption key differs from the server's decryption key.

As discussed above, various embodiments of the present disclosure involve computer systems communicating with one another, changing the manner by which communications are securely communicated over time. For example, as discussed above, a client and server may establish a first communication channel, which may be used for an amount of time until the client and server switch to another communication channel, which may use a different cryptographic primitive or different parameters for the same cryptographic primitive. Various techniques of the present disclosure also involve more complex switching between cryptographic algorithms. Generally, communications between a client and a server and, generally, between two computer systems may switch the cryptographic algorithms being used in accordance with a cryptography algorithm hopping model such as described above.

Figure 18:
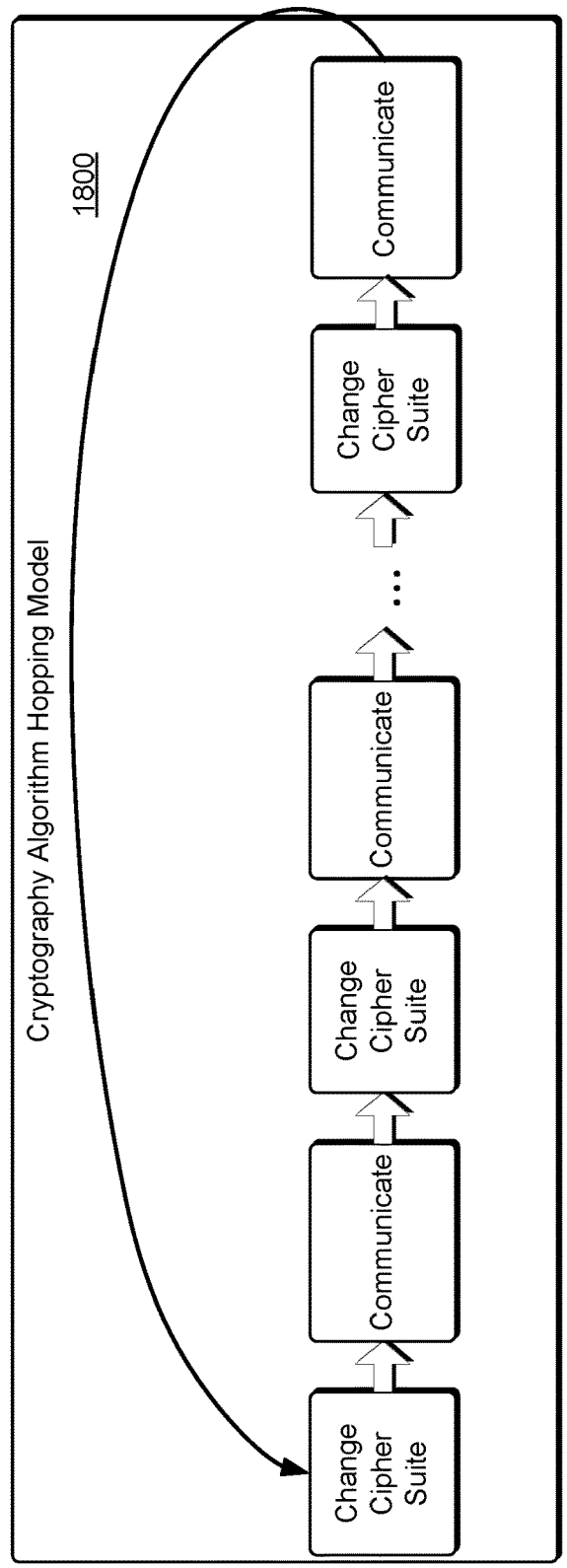
FIG. 18 shows a diagram illustrating a cryptography algorithm hopping model in accordance with an embodiment.

FIG. 18 shows an illustrative example of a cryptography algorithm hopping model 1800 in accordance with an embodiment. As illustrated in FIG. 18, the cryptography algorithm hopping model 1800 may indicate parameters for a cryptography algorithm hopping algorithm referred to more simply as a hopping algorithm. As illustrated in FIG. 18, the cryptography algorithm hopping model 1800 may be configured such that the client and server communicate for an amount of time upon which a cipher suite change is made, whereby the client and server begin communicating using a different cryptographic algorithm or using different parameters of the same cryptographic algorithm.

As illustrated in FIG. 18, each time a cipher suite is changed the client and server may communicate over a secure channel until another change is made. As illustrated in FIG. 18, in some embodiments a cryptography algorithm hopping algorithm is cyclical in that after a number of changes among cipher suites, the order in which the changes occur repeats. It should be noted, however, in other embodiments, the changes between hopping algorithms may not repeat. As an illustrative example, a client and server may support 10 different cryptography algorithms. The 10 cryptography algorithms may be enumerated with the digits zero through nine. The digits of an irrational number, base 10, such as pi may be used to indicate the next cryptography algorithm to use from a current cryptology algorithm. For example, the digits 1415 may indicate that the client and server should start with a cryptography algorithm assigned at the number of one and then move to a cryptography algorithm assigned to number four, then back to a cryptography algorithm assigned to number one and then to a cryptography algorithm assigned to number five and such may continue along the digits of pi or another irrational number. Other variations are also considered as being within the scope of the present disclosure.

Figure 19:
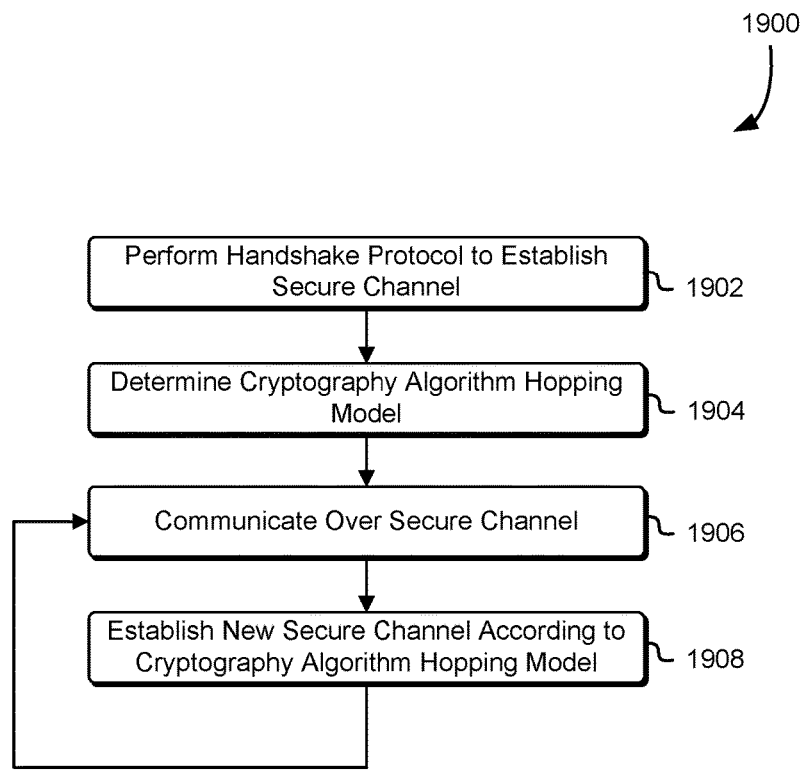
FIG. 19 shows an illustrative example of a process for establishing a secure communications channel in accordance with an embodiment.

FIG. 19 shows an illustrative example of a process 1900 for communicating with another computer system in accordance with an embodiment. The process 1900 may be performed by any suitable system such as a client computer system such as described above or a server computer system such as described above. Generally, any computer system that is configured to communicate with another computer system may be used. In an embodiment, the process 1900 includes performing 1902 a handshake protocol to establish a secure channel. The handshake protocol may be, for example, a TLS handshake or another handshake of another communication protocol.

A cryptography algorithm hopping model may also be determined 1904. The cryptography algorithm hopping model may be determined 1904 in various ways in accordance with various embodiments. For example, in some embodiments, the cryptography algorithm hopping model is shared with the other computer system offline or through a different communication channel. As another example, the cryptography algorithm hopping model may be negotiated between the system performing the process 1900 and the other system over the secure channel that was established 1902. As another example, during the handshake protocol that is performed, the cryptography algorithm hopping model can be negotiated using a model identifier that references a pre-shared model that is maintained as a secret between the system performing the process 1900 and the other system. Negotiation of the cryptography algorithm hopping model may include additional communications over the secure channel that was established 1902, although such communications are not illustrated in FIG. 19. As yet other examples considered as being within the scope of the present disclosure, a third party may provide to two computer systems a cryptography algorithm hopping model. The third party may be selected and communicated with such as described above. Generally, techniques for utilizing a third party for the purpose of obtaining security parameters may be adapted to obtain a cryptography algorithm hopping model in addition to or instead of a set of security parameters.

The process 1900 may also include communicating 1906 over the currently established secure channel. Communicating over the secured channel may include multiple transmissions and receipt of messages over the secure channel, although such operations are not illustrated in FIG. 19 for the purpose of clarity.

After an amount of time, a new secure channel may be established with the other system according to the cryptography algorithm hopping model. In some embodiments, the model includes the security parameters for the new secure channel, although in other embodiments the security parameters for the new secure channel are negotiated, such as using another handshake, each time a switch to a new secure channel is made. Once the new secure channel has been established 1908, the system performing the process 1900 may communicate over the secure channel 1906, including transmitting and/or receiving messages over the new secure channel that was established 1908. As illustrated in FIG. 19, a portion of the process 1900 may repeat in accordance with the cryptography algorithm hopping model while the system performing the process 1900 communicates with the other system.

The way by which a new secure channel is established 1908 may vary in accordance with various embodiments. As noted in some examples, the cryptography algorithm hopping model indicates security parameters to be used for the new channel. As another example, use of a cryptography algorithm hopping model may be combined with the techniques described above utilizing a third party. For example, in accordance with the model when it is time to switch cipher suites, the process 1900 may include communications with a third party to determine the new security parameters. The other computer system with which the secure channel was established 1902 may also obtain information indicating the third party to enable to the other system to obtain the security parameters, as well, such as described above.

In some examples, the third party or, generally, the entity that determines and provides the cryptography algorithm hopping model provides, in the model, the security parameters for the cryptography algorithms specified in the model. In other examples, the process 1900 may include selecting a new third party for establishment of a new secure channel when establishment of a new secure channel is timely in accordance with the cryptography algorithm hopping model. A single third party may be used throughout implementation of the cryptography algorithm hopping model or different third parties may be used at different times during the communications of the system performing the process 1900 and the other system with which the communication channel was established 1902.

Figure 20:
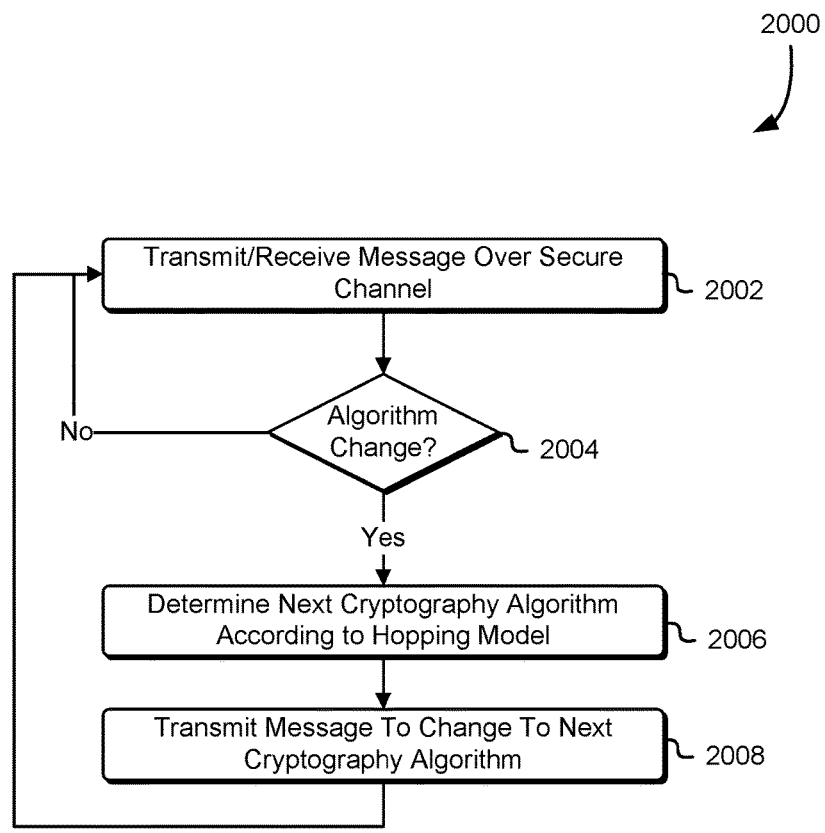
FIG. 20 shows an illustrative example of a process for communicating in accordance with an embodiment.

Numerous variations, including variations described above, in connection with use of a third party are considered as being within the scope of the present disclosure. FIG. 20 shows an illustrative example of a process 2000 for implementing a cryptography algorithm hopping model in accordance with an embodiment. The process 2000 may be performed by any suitable system such as a system performing the process 1900 described above, which may be a client or server computer system.

Turning to the specifics of the embodiment illustrated in FIG. 20, in some examples the process 2000 includes transmitting or receiving 2002 a message over the secure channel. A determination may be made whether to change cryptographic algorithms. It should be noted that a cryptographic algorithm may be changed by changing the security parameters for a cryptographic primitive being used or by changing the cryptographic primitive that is used. It should be noted, however, that in some embodiments changing cryptographic algorithms is limited to changing cryptographic primitives and use of the same cryptographic primitive with different parameters may not be used.

A determination may be made 2004 whether to change cryptographic algorithms. The determination may be made in various ways in accordance with various embodiments. In some examples, the determination is made 2004 based on an amount of data that has been transmitted and/or received since a last change of cryptographic algorithms. The amount of data may be measured in various ways, such as an amount of encrypted data measured in bytes, blocks, or a number of encrypted messages transmitted. For example, as noted, a counter may be maintained by the system performing the process 2000 and the cryptography algorithm hopping model may indicate that a change is to be made after a certain number of messages that have been transmitted and/or received. The counter may also be maintained in the messages themselves such as by an enumeration of messages used in a record protocol such as the record protocol of TOS.

In some examples, the determination whether to change cryptographic algorithms may be made 2004 probabilistically (stochastically). A random number, for example, may be generated and conditions may be placed on the random number such that if the random number satisfies the conditions, a change is made. In such examples, a notification may be made to the other system with which the secure channel is established to notify the other system of the change. Other ways by which the determination may be made 2004 are also considered as being within the scope of the present disclosure.

When it is determined 2004 to change cryptography algorithms, the process 2000 may include determining 2006 and next cryptography algorithm according to the hopping model. A message may then be transmitted 2008 to the other system with which the secure channel is established to indicate to the other system to change to the next cryptography algorithm. As noted, changes in the next cryptography algorithm may include simply using pre-obtained security parameters to switch to a new secure channel, may include negotiating security parameters for this new secure channel, and/or may include communicating with a third party to obtain security parameters for the new secure channel. In some embodiments, the session renegotiation feature of TLS is used as a mechanism to cause a change to a new cryptography algorithm.

Variations of the process 2000 are considered as being within the scope of the present disclosure. For example, as discussed above, the cryptography algorithm hopping model may indicate the changes of cryptographic algorithms at fixed time intervals or variable time intervals. Accordingly, the process 2000 may include monitoring for expiration of a time for a current communication channel. Thus, a determination 2004 whether to change algorithms may be made independently of a remainder of the process 2000.

As another example, clock synchronization and/or other techniques may be used to avoid transmission of a message to change the next cryptography algorithm. For example, two systems communicating with one another with a synced clock may simply change to the next cryptography algorithm at the right time. On some embodiments clocks do not need to be synced and transmission of messages from one system to the other when both systems are using different cryptography algorithms may simply result in errors which may be resolved when the system lagging behind changes to the new cryptography algorithm. Other variations are also considered as being within the scope of the present disclosure.

In some embodiments, the techniques of the present disclosure and, generally, other techniques are utilized to mitigate the effects of suspected denial of service (DoS) attacks, such as distributed denial of service (DDoS) attacks. In some examples, when a client is suspected as participating in a DoS attack, a server may adjust the cipher suites it purports to support to result in a negotiation of a secure communications channel that statistically requires the use of more computational resources from the client than from the server. Example cipher suites with such properties are DHE-RSA-AES256-SHA (a Diffie-Hellman key exchange, RSA for authentication, the Advanced Encryption Standard 256 for encryption and the secure hash algorithm for message authentication) and DHE-DSS-AES256-SHA (the same cipher suite, but with the digital signature standard for authentication). Causing negotiation of a cipher suite that is computationally more efficient for the server than for the client may be used on its own, with techniques that utilize a third party (e.g., with the server communicating with the third party to indicate that it should cause security parameters for such a cipher suite) to be determined, and with a cryptography hopping algorithm models.

The computational efficiency that causes the client to, statistically, use more computational resources than the server may be a characteristic of the handshake and/or for the individual cryptographic primitives (e.g., an encryption algorithm). In this manner, the effects of a DoS attack may be mitigated by selectively causing suspect clients to perform more work than the server, thereby reducing the ability of a client to harmfully affect operation of the server. Further, an additional technical advantage is achieved in that a client misidentified as suspect (e.g., suspect as participating in a DoS attack) will still be able to access functionality of a service associated with the server. In some examples, the delay achieved is significant from a computational perspective, but imperceptible or otherwise insignificant from the perspective of a human operator (e.g., website user).

As discussed, numerous variations utilize symmetric and/or asymmetric cryptographic primitives (algorithms). Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol (an example cryptographic key exchange process), the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode.

Figure 21:
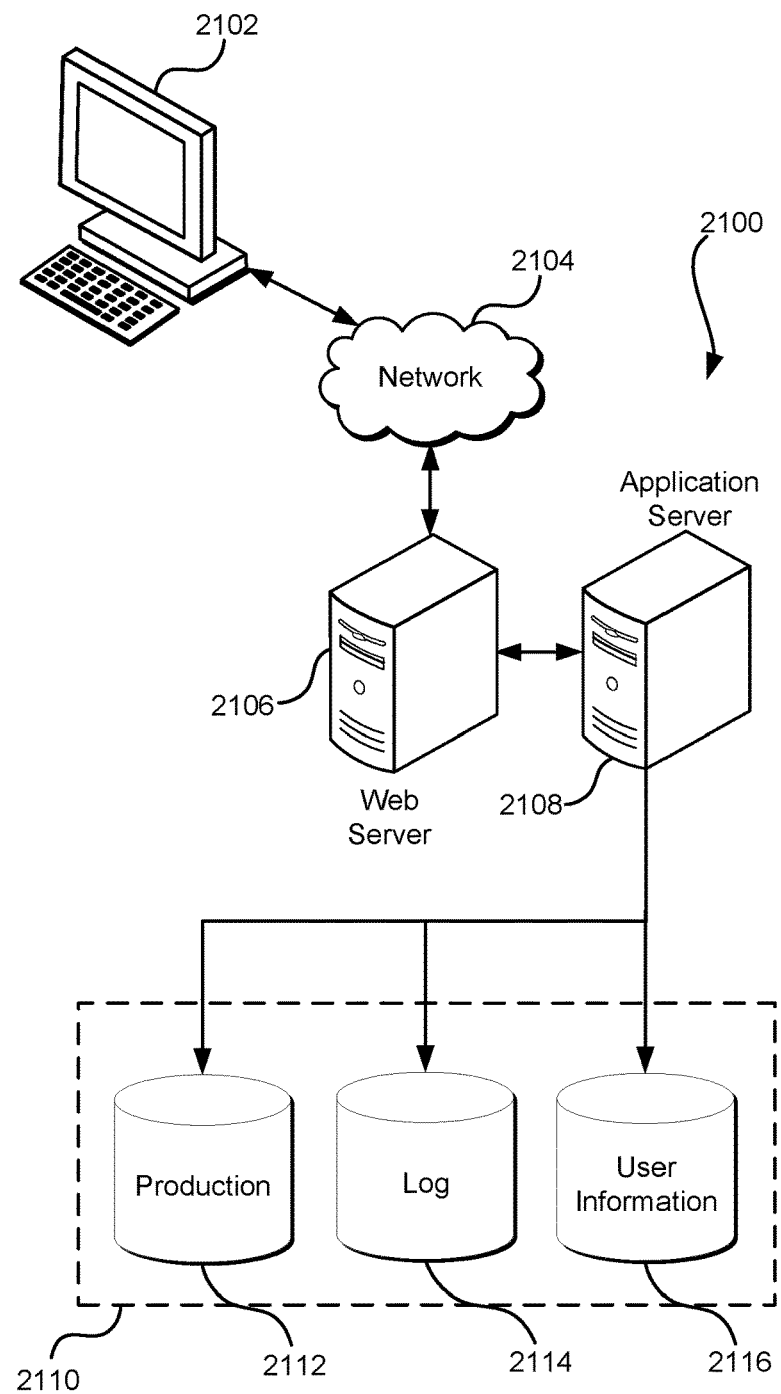
FIG. 21 illustrates an environment in which various embodiments can be implemented.

FIG. 21 illustrates aspects of an example environment 2100 for implementing aspects in accordance with various embodiments. As will be appreciated, although a web-based environment is used for purposes of explanation, different environments may be used, as appropriate, to implement various embodiments. The environment includes an electronic client device 2102, which can include any appropriate device operable to send and/or receive requests, messages or information over an appropriate network 2104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 2106 for receiving requests and serving content in response thereto, although for other networks an alternative device serving a similar purpose could be used as would be apparent to one of ordinary skill in the art.

The illustrative environment includes at least one application server 2108 and a data store 2110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the electronic client device 2102 and the application server 2108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 2110 can include several separate data tables, databases, data documents, dynamic data storage schemes and/or other data storage mechanisms and media for storing data relating to a particular aspect of the present disclosure. For example, the data store illustrated may include mechanisms for storing production data 2112 and user information 2116, which can be used to serve content for the production side. The data store also is shown to include a mechanism for storing log data 2114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2110. The data store 2110 is operable, through logic associated therewith, to receive instructions from the application server 2108 and obtain, update or otherwise process data in response thereto. The application server 2108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 2102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 21. Thus, the depiction of the example environment 2100 in FIG. 21 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Embodiments of the disclosure can be described in view of the following clauses:

Clause 1. A computer-implemented method, comprising:
under the control of one or more computer systems configured with executable instructions,
performing a handshake process to establish a first secure communications channel with a first computer system;
determining a second computer system;
transmitting, to the first computer system and over the established first secure communications channel, an indication of the second computer system;
receiving, over a second secure communications channel established with the second computer system, a set of security parameters defining a third communications channel; and
using the set of security parameters to communicate with the first computer system over the third communications channel.

Clause 2. The computer-implemented method of clause 1, wherein the handshake is a Transport Layer Security handshake.

Clause 3. The computer-implemented method of clause 1 or 2, wherein the indication of the second computer system comprises a network address of the second computer system or a reference to the network address of the second computer system.

Clause 4. The computer-implemented method of any of clauses 1 to 3, wherein the set of security parameters comprise cryptographic material for encrypting messages to be decryptable by the first computer system, the cryptographic material comprising an encryption key or information from which the encryption key is derivable.

Clause 5. The computer-implemented method of any of clauses 1 to 4, wherein determining the second computer system comprises selecting, based at least in part on a location of the first computer system, the second computer system from a plurality of second computer systems individually operable to provide the security parameters.

Clause 6. A system, comprising:
at least one computing device configured to provide one or more services, the one or more services configured to:
determine a set of security parameters for establishment of a secure communications channel;
store the determined set of security parameters in association with a pairing of a first computer system and a second computer system;
receive, a request from the first computer system for the determined set of security parameters, the request indicating the pairing of the first computer system and the second computer system; and
provide, to the first computer system, at least a subset of the determined set of security parameters.

Clause 7. The system of clause 6, wherein the one or more services are further configured to store the determined set of security parameters in association with the pairing of the first computer system and second computer system by storing the determined set of security parameters in association with a session identifier of a session established between the first computer system and the second computer system.

Clause 8. The system of clause 6 or 7, wherein the one or more services are further configured to provide at least a second subset of the determined set of security parameters to the second computer system.

Clause 9. The system of clause 8, wherein the at least the subset of the set of security parameters enables the first computer system to communicate to the second computer system over the secure communications channel without performing a cryptographic key exchange process with the second computer system to establish the secure communications channel.

Clause 10. The system of any of clauses 6 to 9, wherein:
the secure communications channel is a first secure communications channel; and
the one or more services are further configured to perform a handshake process to establish a second secure communications channel with the first computer system; and the request is received over the second secure communications channel.

Clause 11. The system of clause 10, wherein:
the at least the subset is a first subset; and
the one or more services are further configured to maintain a third secure communications channel with the second computer system to provide the second computer system at least a second subset of the set of security parameters.

Clause 12. The system of clause 11, wherein the first subset is different from the at least the second subset.

Clause 13. A non-transitory computer-readable storage medium having stored thereon executable instructions that, when executed by one or more processors of a first computer system, cause the first computer system to at least:
establish a first secure communications channel with a second computer system;
communicate over the established first secure communications channel to determine a third computer system;
obtain, from the third computer system, a set of security parameters for a second secure communications channel; and
use the obtained set of security parameters to communicate with the second computer system over the second secure communications channel.

Clause 14. The non-transitory computer-readable storage medium of clause 13, wherein:
the instructions further comprise instructions that, when executed by the one or more processors, cause the computer system to establish a third secure communications channel with the third computer system; and the set of security parameters is obtained over the third secure communications channel.

Clause 15. The non-transitory computer-readable storage medium of clause 13 or 14, wherein the instructions that cause the first computer system to use the obtained set of security parameters, when executed by the one or more processors, cause the first computer system to encrypt a message to the second computer system using a cryptographic key determined from the obtained set of security parameters.

Clause 16. The non-transitory computer-readable storage medium of clause 15, wherein the instructions further include instructions that, when executed by the one or more processors, cause the first computer system to determine the cryptographic key from the obtained set of security parameters without performing a cryptographic key exchange process involving the second computer system.

Clause 17. The non-transitory computer-readable storage medium of any of clauses 13 to 16, wherein the first secure communications channel and the second secure communications channel utilize different cryptographic primitives for encryption.

Clause 18. The non-transitory computer-readable storage medium of any of clauses 13 to 17, wherein the instructions further include instructions that, when executed by the one or more processors, cause the first computer system to negotiate selection of the third computer system from a plurality of computer systems.

Clause 19. The non-transitory computer-readable storage medium of any of clauses 13 to 18, wherein:
the instructions further include instructions that, when executed by the one or more processors, cause the first computer system to receive, from the second computer system over the first secure channel, information specifying the third computer system; and
the instructions that cause the first computer system to obtain the set of security parameters, when executed by the one or more processors, cause the first computer system to request the set of security parameters from the third computer system as a result of the information specifying the third computer system.

Clause 20. The non-transitory computer-readable storage medium of clause 19, wherein:
the instructions that cause the first computer system to obtain the set of security parameters, when executed by the one or more processors, cause the first computer system to perform a handshake process with the third computer system to establish a third secure communications channel; and
the instructions that cause the first computer system to request the set of security parameters, when executed by the one or more processors, cause the first computer system to transmit a request for the set of security parameters over the third secure channel.

Clause 21. A computer-implemented method, comprising:
under the control of a first computer system configured with executable instructions,
obtaining a cryptography algorithm hopping model that specifies a plurality of cryptography algorithms and information sufficient to determine a sequence of the plurality of cryptography algorithms and to determine when to switch from a cryptography algorithm in the sequence to a next cryptography algorithm in the sequence;
establishing a first secure communications channel with a second computer system, the secure communications channel associated with a first cryptography algorithm of the plurality of cryptography algorithms;
communicating with the second computer system over the established first secure communications channel by transmitting messages that are encrypted using the first cryptography algorithm;
using the obtained cryptography algorithm hopping model to determine when to switch to a second cryptography algorithm, the second cryptography algorithm being a next in the sequence relative to the first cryptography algorithm; and
communicating with the second computer system over a second secure communications channel by transmitting messages that are encrypted using the second cryptography algorithm.

Clause 22. The computer-implemented method of clause 21, wherein the cryptography algorithm hopping model is pre-shared as a secret with the second computer system prior to establishing the first secure communications channel.

Clause 23. The computer-implemented method of clause 21 or 22, further comprising negotiating the cryptography algorithm hopping model with the second computer system over the established first secure communications channel.

Clause 24. The computer-implemented method of any of clauses 21 to 23, wherein using the obtained cryptography algorithm hopping model to determine when to switch to the second cryptography algorithm includes determining an amount of data transferred over the established first secure communications channel and wherein a determination whether to switch to the second cryptography algorithm depends on the determined amount of data.

Clause 25. A system, comprising:
at least one computing device configured to implement one or more services, wherein the one or more services are configured to:
determine information sufficient to determine when to switch from a cryptography algorithm in a sequence of a plurality of cryptography algorithms to a next cryptography algorithm in the sequence of the plurality of cryptography algorithms; and
as part of communicating with a second system using encrypted messages, switch from a first cryptography algorithm to a second cryptography algorithm in accordance with the determined information.

Clause 26. The system of clause 25, wherein the determined information is further sufficient to determine the sequence.

Clause 27. The system of clause 25 or 26, wherein the one or more services are further configured to negotiate the information with the second system during a handshake process with the second system.

Clause 28. The system of clause 27, wherein the handshake process results in the plurality of cryptography algorithms being mutually supported by both the system and the second system.

Clause 29. The system of any of clauses 25 to 28, wherein the information defines a set of time intervals for switching cryptography algorithms in the sequence.

Clause 30. The system of clause 29, wherein the time intervals have equal length.

Clause 31. The system of any of clauses 25 to 30, wherein the one or more services are further configured to use the information to switch from the first cryptography algorithm to the second cryptography algorithm without performing a handshake process with the second system.

Clause 32. The system of any of clauses 25 to 31, wherein the one or more services are further configured to:
establish a secure communications channel with the second system;

communicate with the second system to determine a third system; and obtain the information from the third system.

Clause 33. A non-transitory computer-readable storage medium having stored thereon executable instructions that, when executed by one or more processors of a computer system, cause the computer system to at least:
encrypt a first message to a second computer system using a first cryptography algorithm;
after transmitting the first message to the second computer system, use a cryptography algorithm hopping model to determine to switch to a second cryptography algorithm; and
after determining to switch to the second cryptography algorithm, encrypt a second message to the second computer system using a second cryptography algorithm different from the first cryptography algorithm.

Clause 34. The non-transitory computer-readable storage medium of clause 33, wherein the instructions further comprise instructions that, when executed by the one or more processors, cause the computer system to:
perform a handshake process with the second computer system to establish a secure communications channel; and
obtain the cryptography algorithm hopping model over the established secure communications channel.

Clause 35. The non-transitory computer-readable storage medium of clause 33 or 34, wherein the instructions further comprise instructions that, when executed by the one or more processors, cause the computer system to:
receive information indicating a set of cryptography algorithms supported by the second computer system; and
determine the cryptography hopping algorithm based at least in part on the received information.

Clause 36. The non-transitory computer-readable storage medium of clause 35, wherein the instructions further include instructions that, when executed by the one or more processors, cause the computer system to provide the determined cryptography hopping algorithm to the second computer system.

Clause 37. The non-transitory computer-readable storage medium of any of clauses 33 to 36, wherein the instructions further include instructions that, when executed by the one or more processors, cause the computer system to:
provide, to the second computer system, information indicating a set of cryptography algorithms supported by the computer system; and
receive the cryptography algorithm hopping model from the second computer system.

Clause 38. The non-transitory computer-readable storage medium of any of clauses 33 to 37, wherein the instructions further include instructions that, when executed by the one or more processors, cause the computer system to:
determine a third computer system; and
receive the cryptography algorithm hopping model from the determined third system.

Clause 39. The non-transitory computer-readable storage medium of clause 38, wherein the instructions further include instructions that, when executed by the one or more processors, cause the computer system to specify the third computer system to the second computer system.

Clause 40. The non-transitory computer-readable storage medium of clause 38, wherein the instructions further include instructions that, when executed by the one or more processors, cause the computer system to receive information specifying the third computer system from the second computer system.

Clause 41. A computer-implemented method comprising:
under the control of one or more computer systems configured with executable instructions,
receiving, from a client computer system, a message to perform a handshake process to establish a cryptographically protected communications session, the message specifying a first list of cipher suites supported by the client for receiving, via the cryptographically protected communications session, messages and a second list of cipher suites supported by the client for transmitting, via the cryptographically protected communications session, messages;
obtaining a third list of cipher suites supported for transmitting, via the cryptographically protected communications session, messages and a fourth list of cipher suites supported for receiving, via the cryptographically protected communications session, messages;
selecting a first cipher suite for transmitting messages to the client via the cryptographically protected communication session, the first selected cipher suite being a member of the first list and a member of the third list;
selecting a second cipher suite for receiving messages from the client via the cryptographically protected communication session, the second selected cipher suite being a member of the second list and a member of the fourth list; and
completing the handshake process to establish the cryptographically protected communications session such that the cryptographically protected communications session utilizes the first selected cipher suite for transmissions to the client and utilizes the second selected cipher suite for receiving transmissions from the client.

Clause 42. The computer-implemented method of Clause 41, wherein the first list is different from the third list and the second list is different from the fourth list.

Clause 43. The computer-implemented method of Clause 41 or 42, wherein the cryptographically protected communications session comprises at least 70 percent of the messages in accordance with TLS version 1.2.

Clause 44. The computer-implemented method of any of clauses 41 to 43, wherein communications according to the first selected cipher suite are encrypted and communications according to the second selected cipher suite are unencrypted.

Clause 45. The computer-implemented method of claim any of clauses 41 to 44, wherein:
the first list of cipher suites is ordered by a first ranking and the second list of cipher suites is ordered by a second ranking;
selecting the first cipher suite is based at least in part on the first ranking; and
selecting the second cipher suite is based at least in part on the second ranking.

Clause 46. A system, comprising at least one computing device configured to implement one or more services, the one or more services configured to:
negotiate, during a handshake process of a protocol for establishing cryptographically protected communications sessions, a plurality of cipher suites supported by a remote computer system;
establish the cryptographically protected communications session with the remote computer system; and
communicate over the established protected communications session with the remote computer system:
a first set of data communicated over the established protected communications session is cryptographically protected according to a first cipher suite of the plurality of cipher suites; and a second set of data communicated over the established protected communications session is cryptographically protected according to a second cipher suite of the plurality of cipher suites.

Clause 47. The system of clause 46, wherein the one or more services communicate over the established protected communications session such that:

a third set of data communicated over the established protected communications session is cryptographically protected according to a third cipher suite of the plurality of cipher suites.

Clause 48. The system of clause 46 or 47, wherein:

the first cipher suite is associated with a first use context;

the second cipher suite is associated with a second use context; and the first set of data is transmitted in the first use context and the second set of data is transmitted in the second use context.

Clause 49. The system of any of clauses 46 to 48, wherein the one or more services select the plurality of cipher suites based at least in part on metadata of a connection with the remote computer system.

Clause 50. The system of clause 49, wherein the metadata includes a geolocation.

Clause 51. The system of clause 49, wherein the metadata includes a connection latency value.

Clause 52. The system of clause 49, wherein the metadata includes a connection bandwidth.

Clause 53. The system of any of clauses 46-52, wherein the at least one computing device is further configured to:

receive a request;

determine a first security level for a first part of the request;

determine a second security level for a second part of the request; and wherein the first cipher suite is determined based at least in part on the first part of the request and the second cipher suite is determined based at least in part on the second part of the request.

Clause 54. The system of any of clauses 46 to 53, wherein negotiation of the plurality of cipher suites results in an indexed set of cipher suites and individual records of the cryptographically protected communications session are configured to indicate which of the indexed set of cipher suites is being used.

Clause 55. A non-transitory computer-readable storage medium having stored thereon executable instructions that, when executed by one or more processors of a computer system, cause the computer system to at least:

as part of a handshake process to establish a cryptographically protected communications session, negotiate a plurality of cipher suites; and complete the handshake process to establish the cryptographically protected communications session.

Clause 56. The non-transitory computer-readable storage medium of clause 55, wherein the executable instructions are further configured to cause the computer system to at least communicate over the established cryptographically protected communications session using at least two cipher suites of the selected plurality of cipher suites.

Clause 57. The non-transitory computer-readable storage medium of clause 56, wherein the executable instructions are further configured to cause the computer system to at least communicate over the established cryptographically protected communications session using a third cipher suite of the selected plurality of cipher suites.

Clause 58. The non-transitory computer-readable storage medium of any of clauses 55 to 57, the plurality of cipher suites comprises a first cipher suite for use in a first use context and a second cipher suite for use in a second use context.

Clause 59. The non-transitory computer-readable storage medium of any of clauses 55 to 58, wherein the at least two cipher suites of the selected plurality of cipher are determined based at least in part on a connection metadata.

Clause 60. The non-transitory computer-readable storage medium of clause 59, wherein the connection metadata includes an internet connection type.

Clause 61. The non-transitory computer-readable storage medium of clause 59, wherein the connection metadata includes a hardware type.

Clause 62. The non-transitory computer-readable storage medium of any of clauses 55 to 61, wherein the communicating over the established cryptographically protected communications session includes sending, in response to a request, a first partial completion message corresponding to a first part of a request and a second partial completion message corresponding to a second part of the request.

Clause 63. The non-transitory computer-readable storage medium of any of clauses 55 to 62, wherein the executable instructions further cause the computer system to at least:

receive a request;

determine a first security level for a first part of the request;

determine a second security level for a second part of the request; and wherein the first cipher suite is selected based at least in part on the first part of the request and the second cipher suite is selected based at least in part on the second part of the request.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    negotiating, during a handshake process of a protocol for establishing cryptographically protected communications sessions, a plurality of cipher suites supported by a remote computer system;
    establishing the cryptographically protected communications session with the remote computer system;
    receiving a request for data from the remote computer system over the cryptographically protected communications session, a first part of the request indicating a first type of security for a first set of the data and a second part of the request indicating a second type of security for a second set of the data; and
    communicating a message over the protected communications session with the remote computer system, the message including:
        the first set of data that is cryptographically protected, in response to the first part of the request, to fulfill the first part of the request according to a first cipher suite of the plurality of cipher suites; and
        the second set of data that is cryptographically protected, in response to the second part of the request, to fulfill the second part of the request according to a second cipher suite of the plurality of cipher suites.

2. The computer-implemented method of claim 1, wherein the message further includes a third set of data communicated that is cryptographically protected according to a third cipher suite of the plurality of cipher suites.

3. The computer-implemented method of claim 1, wherein:
    the first cipher suite is designated for use with non-sensitive information; and
    the second cipher suite is designated for use with sensitive information.

4. The computer-implemented method of claim 1, wherein the plurality of cipher suites is negotiated based at least in part on metadata of a connection with the remote computer system.

5. A system, comprising:
    one or more processors; and
    memory including executable instructions that, as result of being executed by the one or more processors, cause the system to at least:
        negotiate, during a handshake process of a protocol for establishing a cryptographically protected communications session, a plurality of cipher suites supported by a remote computer system;
        establish the cryptographically protected communications session with the remote computer system;
        receive a request for data over the cryptographically protected communication session, a first part of the request indicating a first type of cryptographic protection for a first set of data, and a second part of the request indicating a second type of cryptographic protection for a second set of data; and
        communicate a message over the cryptographically protected communications session with the remote computer system, the message including:
            the first set of data that is cryptographically protected according to a first cipher suite of the plurality of cipher suites, wherein the first cipher suite is suitable for use in fulfilling the first part of the request; and
            the second set of data that is cryptographically protected according to a second cipher suite of the plurality of cipher suites, wherein the second cipher suite is suitable for use in fulfilling the second part of the request.

6. The system of claim 5, wherein the executable instructions that cause the system to communicate the message further communicate the message in response to a request received from the remote computer system.

7. The system of claim 5, wherein the memory further includes executable instructions that, as result of being executed by the one or more processors, cause the system to:
receive, from the remote computer system, a request comprising a first part and a second part;
select the first cipher suite based at least in part on a first security level associated with the first part; and
select the second cipher suite based at least in part on a second security level, different from the first security level, associated with the second part.

8. The system of claim 5, wherein the executable instructions that cause the system to communicate the message further cause the system to communicate the message according to a third cipher suite of the plurality of cipher suites.

9. The system of claim 5, wherein the executable instructions further cause the system to select the first cipher suite and the second cipher suite from the plurality of cipher suites based at least in part on at least one of an Internet connection type or a hardware type of the remote computer system.

10. The system of claim 5, wherein:
the first cipher suite is for use in a first use context; and
the second cipher suite is for use in a second use context different from the first use context.

11. The system of claim 10, wherein the first use context is associated with a first data security level and the second use context is associated with a second data security level.

12. The system of claim 10, wherein the memory further includes executable instructions that, as result of being executed by the one or more processors, cause the system to:
obtain, in response to receipt of a request for a set of data, the set of data;
parse the set of data to determine that:
a first subset of the set of data is associated with the first use context; and
a second subset of the set of data is associated with the second use context;
cryptographically protect the first subset according to the first cipher suite to produce the first set of data; and
cryptographically protect the second subset according to the second cipher suite to produce the second set of data.

13. A non-transitory computer-readable storage medium comprising stored thereon executable instructions that, as a result of being executed by one or more processors of a computer system, cause the computer system to at least:
negotiate, as part of a handshake process to establish a cryptographically protected communications session, a plurality of cipher suites;
complete the handshake process to establish the cryptographically protected communications session;
receive a request for a set of data from a remote computer system over the cryptographically protected communications session, a first part of the request indicating a first type of security for a first subset of the set of data and a second part of the request indicating a second type of security for a second subset of the set of data; and
communicate a message over the cryptographically protected communications session using at least two cipher suites of the plurality of cipher suites to fulfill the request for the set of data.

14. The non-transitory computer-readable storage medium of claim 13, wherein the executable instructions that cause the computer system to negotiate the plurality of cipher suites further cause the computer system to negotiate the plurality of cipher suites based at least in part on at least one of:
geolocation data of another computer system associated with the handshake process,
a connection latency value associated with the other computer system, or
a connection bandwidth associated with the other computer system.

15. The non-transitory computer-readable storage medium of claim 13, wherein the executable instructions further cause the computer system to at least:
evaluate the set of data to determine that:
the first subset of the set of data is associated with a first use context that corresponds to a first cipher suite of the at least two cipher suites; and
the second subset of the set of data is associated with a second use context that corresponds on a second cipher suite of the at least two cipher suites; and
generate the message by at least applying the first cipher suite to the first subset and the second cipher suite to the second subset.

16. The non-transitory computer-readable storage medium of claim 13, wherein the executable instructions that cause the computer system to negotiate the plurality of cipher suites as part of the handshake process include instructions that cause the computer system to:
receive, from a client device, a first list of cipher suites for client-to-server communications and a second list of cipher suites for server-to-client communications; and
determine the plurality of cipher suites by selecting at least one cipher suite from the first list and selecting at least one cipher suite from the second list.

17. The non-transitory computer-readable storage medium of claim 13, wherein:
the executable instructions further cause the computer system to:
determine a first security level associated with a first part of a received request; and
determine a second security level associated with a second part of the received request; and
the executable instructions that cause the computer system to communicate the message using the at least two cipher suites further include instructions that cause the computer system to determine the at least two cipher suites based at least in part on the first security level and the second security level.

18. The non-transitory computer-readable storage medium of claim 13, wherein:
the executable instructions that cause the computer system to negotiate the plurality of cipher suites further include instructions that cause the computer system to establish a plurality of index values having a correspondence to each of the plurality of cipher suites; and
the executable instructions that cause the computer system to communicate the message further cause the computer system to communicate index values of the plurality of index values that correspond to the at least two cipher suites.

19. The non-transitory computer-readable storage medium of claim 13, wherein the executable instructions that cause the computer system to negotiate the plurality of cipher suites include instructions that cause the computer system to determine the plurality of cipher suites based at least in part on hardware capabilities of a client device to which the message is communicated.

20. The non-transitory computer-readable storage medium of claim 13, wherein:
- the executable instructions that cause the computer system to complete the handshake process include instructions that cause the computer system to establish a first secure connection to a third party entity; and
- the executable instructions that cause the computer system to communicate the message include instructions that cause the computer system to communicate the message to a client device via the first secure connection and a second secure connection established as a result of another handshake process between the client device and the third party entity.

21. The computer-implemented method of claim 1, further comprising, communicating a partial completion of the message in response to the first part of the request that is cryptographically protected according to the first cipher suite of the plurality of cipher suites.

* * * * *